US012487540B2

(12) United States Patent
Furuta et al.

(10) Patent No.: US 12,487,540 B2
(45) Date of Patent: Dec. 2, 2025

(54) IMAGE FORMING APPARATUS WITH TOP EMISSION LIGHT EMITTING DEVICE

(71) Applicant: CANON KABUSHIKI KAISHA, Tokyo (JP)

(72) Inventors: Yasutomo Furuta, Chiba (JP); Hayato Koyama, Chiba (JP); Koichiro Nakanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/677,746

(22) Filed: Feb. 22, 2022

(65) Prior Publication Data

US 2022/0179335 A1 Jun. 9, 2022

Related U.S. Application Data

(63) Continuation of application No. PCT/JP2020/028778, filed on Jul. 28, 2020.

(30) Foreign Application Priority Data

Aug. 23, 2019 (JP) ................................ 2019-153102
Aug. 23, 2019 (JP) ................................ 2019-153103

(51) Int. Cl.
*G03G 15/043* (2006.01)
*B41J 2/45* (2006.01)
*G03G 15/00* (2006.01)

(52) U.S. Cl.
CPC .............. *G03G 15/043* (2013.01); *B41J 2/45* (2013.01); *G03G 15/5008* (2013.01)

(58) Field of Classification Search
CPC ... G03G 15/04054; G03G 15/043; B41J 2/45; G06K 15/1247
See application file for complete search history.

(56) References Cited

U.S. PATENT DOCUMENTS 6,297,842 B1 * 10/2001 Koizumi ................ H10K 50/11 347/237
2003/0007064 A1 * 1/2003 Ohno ......................... B41J 2/45 347/238
2006/0197102 A1 * 9/2006 Ogihara ........... G03G 15/04054 257/40
2007/0040888 A1 2/2007 Seo
2007/0235741 A1 * 10/2007 Nakamura ................ B41J 2/45 257/79

(Continued)

FOREIGN PATENT DOCUMENTS

CN 101272646 A 9/2008
EP 0487715 B1 10/1996

(Continued)

OTHER PUBLICATIONS

Machine Translation of JP 2010-212113. Sep. 2010. (Year: 2010).*
Machine Translation of JP 2012-111134. (Year: 2012).*

*Primary Examiner* — Carla J Therrien
(74) *Attorney, Agent, or Firm* — Canon U.S.A., Inc. IP Division

(57) ABSTRACT

A second electrode is laminated on a light emitting layer on an opposite side across the light emitting layer from a first electrode laminated on a silicon substrate. The second electrode is capable of transmitting light. A photoconductor drum is exposed to light by using light transmitted through the second electrode.

19 Claims, 17 Drawing Sheets

(56) References Cited

U.S. PATENT DOCUMENTS

| | | | | |
|---|---|---|---|---|
| 2008/0017861 | A1* | 1/2008 | Ishiguro | B41J 2/45 257/59 |
| 2012/0120176 | A1* | 5/2012 | Kinoshita | G03G 15/04036 347/256 |
| 2014/0253657 | A1* | 9/2014 | Tatebe | G03G 13/04 347/130 |
| 2015/0008409 | A1* | 1/2015 | Ito | H10K 85/626 257/40 |
| 2015/0015657 | A1* | 1/2015 | Shikina | G03G 15/04054 347/118 |
| 2015/0162549 | A1* | 6/2015 | Kamatani | G03G 15/04054 257/40 |
| 2015/0286902 | A1 | 10/2015 | Furuta | |
| 2016/0018754 | A1* | 1/2016 | Michiyoshi | G03G 15/04054 347/130 |
| 2018/0253025 | A1 | 9/2018 | Tanimoto | |

FOREIGN PATENT DOCUMENTS

| | | | | |
|---|---|---|---|---|
| EP | 1 104 937 | A1 | | 6/2001 |
| EP | 1 186 428 | A1 | | 3/2002 |
| JP | 2001-260411 | A | | 9/2001 |
| JP | 2008147608 | A | | 6/2008 |
| JP | 2008269792 | A | | 11/2008 |
| JP | 2009266858 | A | | 11/2009 |
| JP | 2010-212113 | A | | 9/2010 |
| JP | 2012111134 | A | * | 6/2012 |
| JP | 2012125967 | A | | 7/2012 |
| JP | 2014-199794 | A | | 10/2014 |
| JP | 2015-16615 | A | | 1/2015 |
| KR | 20140124069 | A | | 10/2014 |

* cited by examiner

IMAGE FORMING APPARATUS WITH TOP EMISSION LIGHT EMITTING DEVICE

CROSS-REFERENCE TO RELATED APPLICATIONS

This application is a Continuation of International Patent Application No. PCT/JP2020/028778, filed Jul. 28, 2020, which claims the benefit of Japanese Patent Application No. 2019-153103, filed Aug. 23, 2019 and No. 2019-153102, filed Aug. 23, 2019, both of which are hereby incorporated by reference herein in their entirety.

TECHNICAL FIELD

The present invention relates to an electrophotographic image forming apparatus and, more specifically, to an image forming apparatus with a top emission light emitting device as a light emitting device that emits light for exposing a photoconductor to light.

BACKGROUND ART

Generally, there has been known an electrophotographic image forming apparatus that forms an image by exposing a photoconductor drum to light by using an exposure head including LEDs (Light Emitting Diodes) or organic EL (Organic Electro Luminescent) diodes. The exposure head includes a plurality of light emitting portions arranged in a direction substantially orthogonal to a rotation direction of the photoconductor drum. The exposure head further includes a rod lens array for forming an image on the photoconductor drum with light emitted from the light emitting portions. The number of light emitting portions and the distance between adjacent light emitting portions depend on the width of an image forming region on the photoconductor drum and the resolution of an output image of the image forming apparatus. In the case of, for example, a printer with an output resolution of 1200 dpi, the width of one pixel is 21.16 μm (the third and subsequent decimal places are omitted), so the light emitting portions are formed such that the center-to-center distance between adjacent light emitting portions is 21.16 μm. Since such an image forming apparatus using an exposure head does not use a deflector, such as a polygon mirror, unlike a scanning laser beam printer, the number of components used is less than that of a scanning laser printer, so a downsized and low-cost apparatus can be provided.

There has been suggested an exposure head using a TFT circuit and an organic EL device on a transparent glass substrate as such an exposure head (see, for example, PTL 1).

CITATION LIST

Patent Literature

PTL 1 Japanese Patent Laid-Open No. 2015-162428

A light emitting device provided in the exposure head described in PTL 1 is a so-called bottom emission light emitting device that causes light from an organic layer to exit from the TFT circuit side. In a bottom emission light emitting device, an optical path is limited by a TFT circuit, so the ratio of the amount of light emitted from the light emitting device to the amount of light produced in a light emitting layer is low. For this reason, when a bottom emission light emitting device is used as an exposure light source for a photoconductor, there is a challenge that the amount of light produced needs to be increased.

SUMMARY OF INVENTION

The present invention is contemplated in view of the above problem. An image forming apparatus of the present invention is an image forming apparatus. The image forming apparatus includes a photoconductor configured to be driven to rotate about a rotational axis, and an exposure head that includes a light emitting device, and a lens array configured to guide light emitted from the light emitting device to a photoconductor surface. The light emitting device includes a silicon substrate that includes a drive circuit configured to drive the light emitting device, a second electrode layer that includes a plurality of electrodes arranged in a two-dimensional array in a rotation direction of the photoconductor and in a direction substantially parallel to the rotational axis and separately formed on the silicon substrate, a light emitting layer formed in a layer on the second electrode layer and configured to produce light when a voltage is applied, and a first electrode layer provided in common for the plurality of electrodes of the second electrode layer on an opposite side across the light emitting layer from a side on which the silicon substrate and the second electrode layer are disposed and configured to be capable of transmitting light. The drive circuit is configured to control a voltage of each of the electrodes included in the second electrode layer in accordance with image data such that the light emitting layer produces light. The lens array is disposed between the first electrode layer and the photoconductor surface such that light transmitted through the first electrode layer is guided onto the photoconductor. An image forming apparatus of the present invention is an image forming apparatus. The image forming apparatus includes a photoconductor configured to be driven to rotate about a rotational axis, and an exposure head that includes a light emitting device, and a lens array configured to guide light emitted from the light emitting device to a photoconductor surface. The light emitting device includes a silicon substrate that includes a drive circuit configured to drive the light emitting device, a second electrode layer that includes a plurality of electrodes arranged in a direction substantially parallel to the rotational axis and separately formed on the silicon substrate, a light emitting layer formed in a layer on the second electrode layer and configured to produce light when a voltage is applied, and a first electrode layer provided in common for the plurality of electrodes of the second electrode layer on an opposite side across the light emitting layer from a side on which the silicon substrate and the second electrode layer are disposed and configured to be capable of transmitting light. The drive circuit is configured to control a potential of each of the electrodes included in the second electrode layer in accordance with image data such that the light emitting layer produces light. The lens array is disposed between the first electrode layer and the photoconductor surface such that light transmitted through the first electrode layer is guided onto the photoconductor.

Further features of the present invention will become apparent from the following description of exemplary embodiments with reference to the attached drawings.

DESCRIPTION OF EMBODIMENTS

First Embodiment

Figure 1:
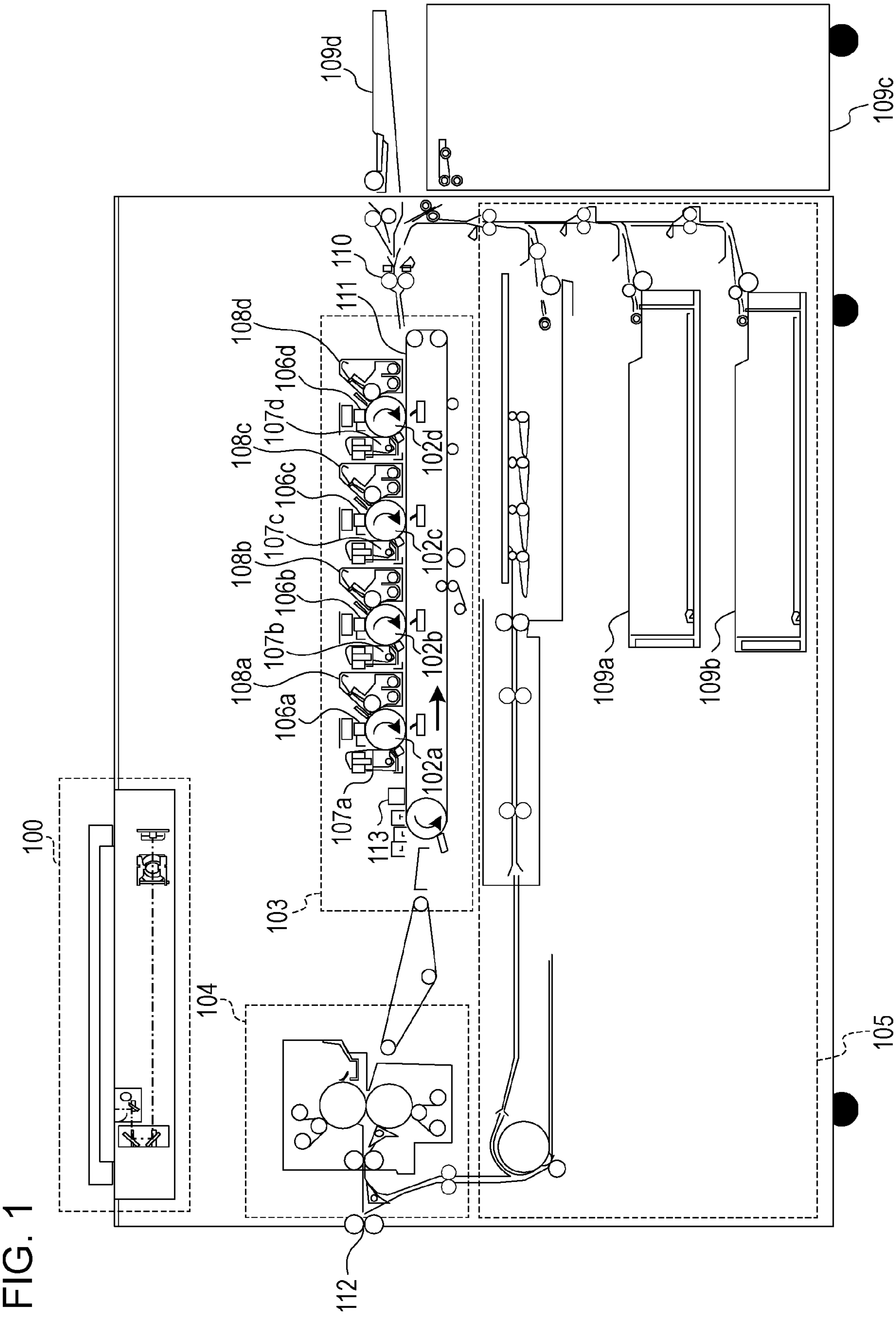
FIG. 1 is a schematic sectional view of an image forming apparatus according to an embodiment.

FIG. 1 is a schematic sectional view showing the configuration of an electrophotographic image forming apparatus according to a first embodiment. The image forming apparatus shown in FIG. 1 is a multifunction peripheral (MFP) that includes a scanner function and a printer function. The image forming apparatus is made up of a scanner section 100, an image forming section 103, a fixing section 104, a paper feeding and conveying section 105, and a printer control section (not shown) that controls these sections. The scanner section 100 optically reads a document image by illuminating a document put on an original base plate and converts the read image to an electrical signal, thus creating image data.

The image forming section 103 includes quadruple image forming stations arranged in order of cyan (C), magenta (M), yellow (Y), and black (K) stations along a rotation direction (counterclockwise direction) of an endless conveying belt 111. The four image forming stations have the same configuration. Each of the image forming stations includes a photoconductor drum 102, an exposure head 106, a charger 107, and a developing unit 108. The photoconductor drum 102 is a photoconductor that rotates in an arrow direction (clockwise direction). The suffixes a, b, c, and d of the photoconductor drum 102, the exposure head 106, the charger 107, and the developing unit 108 respectively indicate components corresponding to the black (K), yellow (Y), magenta (M), and cyan (C) image forming stations. Hereinafter, unless a specific photoconductor drum or the like is specified, the suffixes of reference signs are omitted.

The image forming section 103 drives the photoconductor drum 102 to rotate and charges the photoconductor drum 102 with the charger 107. The exposure head 106 that is an exposure means causes a light emitting device to produce light in accordance with image data, condenses the light produced by the light emitting device onto the photoconductor drum 102 (photoconductor) with a rod lens array, and forms an electrostatic latent image. The developing unit 108 that is a developing means develops the electrostatic latent image formed on the photoconductor drum 102 by using toner. The developed toner image is transferred to recording paper on the conveying belt 111 that conveys the recording paper. Such a series of electrophotographic processes is performed in each of the image forming stations. During image formation, after a predetermined time elapses from the start of image formation in the cyan (C) image forming station, image forming operation is sequentially performed in the magenta (M), yellow (Y), and black (K) image forming stations. Thus, a full-color image is formed.

The image forming apparatus shown in FIG. 1 includes internal paper feeding units 109*a*, 109*b* of the paper feeding and conveying section 105, an external paper feeding unit 109*c* that is a large-capacity paper feeding unit, and a manual paper feeding unit 109*d*, as units to feed recording paper. During image formation, recording paper is fed from the paper feeding unit designated in advance from among these feeding units, and the fed recording paper is conveyed to registration rollers 110. The registration rollers 110 convey the recording paper to the conveying belt 111 at timing at which a toner image formed in the above-described image forming section 103 is transferred to the recording paper. The toner image formed on the photoconductor drum 102 of each image forming station is sequentially transferred to the recording paper conveyed by the conveying belt 111. The recording paper to which the unfixed toner images are transferred is conveyed to the fixing section 104. The fixing section 104 incorporates a heat source, such as a halogen heater, and fixes the toner images on the recording paper by heating and pressurizing the toner images on the recording paper with two rollers. The recording paper on which the toner images are fixed by the fixing section 104 is delivered by delivery rollers 112 to outside the image forming apparatus.

On the downstream side of the black (K) image forming station in a recording paper conveying direction, an optical sensor 113 that is a detecting means is disposed at a position facing the conveying belt 111. The optical sensor 113 detects the position of test images formed on the conveying belt 111 to derive the amounts of misregistration among toner images of the image forming stations. The amounts of misregistration derived by the optical sensor 113 are provided to an image controller unit 700 (described later) (see FIGS. 7A and 7B) and the like, and the image position of each color is corrected such that a full-color toner image with no misregistration is transferred to recording paper. The printer control section (not shown) executes image forming operation while controlling the above-described scanner section 100, image forming section 103, fixing section 104, paper feeding and conveying section 105, and the like in accordance with an instruction from an MFP control unit (not shown) that controls the entire multifunction peripheral (MFP).

Here, the image forming apparatus configured to directly transfer a toner image formed on the photoconductor drum 102 of each image forming station to recording paper on the conveying belt 111 has been described as an example of the electrophotographic image forming apparatus. However, the embodiment is not limited to such a printer configured to directly transfer a toner image on the photoconductor drum 102 to recording paper. For example, the embodiment may also be an image forming apparatus that includes a primary transfer section that transfers a toner image on the photoconductor drum 102 to an intermediate transfer belt and a secondary transfer section that transfers the toner image on the intermediate transfer belt to recording paper.

Configuration of Exposure Head

Figure 2A:
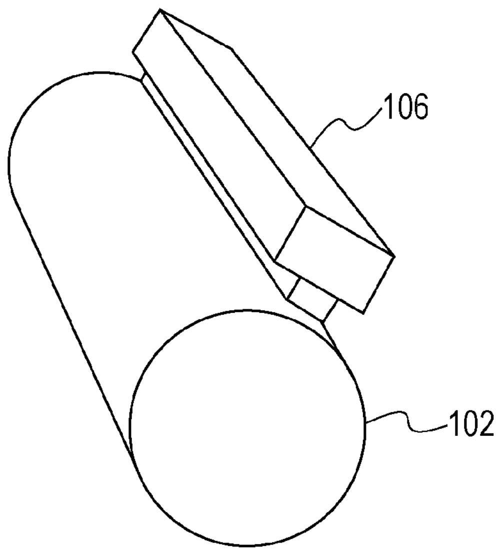
FIG. 2A is a view showing a positional relationship between an exposure head and a photoconductor drum according to the embodiment.
Figure 2B:
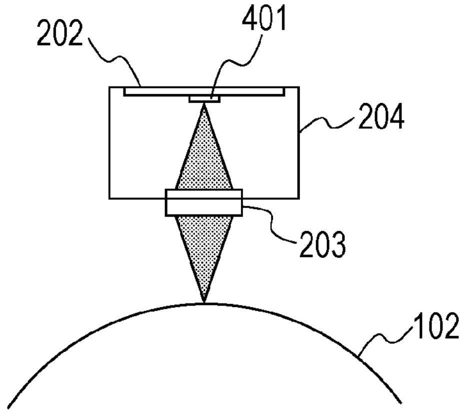
FIG. 2B is a view showing the positional relationship between the exposure head and the photoconductor drum according to the embodiment.

Next, the exposure head 106 that exposes the photoconductor drum 102 to light will be described with reference to FIGS. 2A and 2B. FIG. 2A is a perspective view showing a positional relationship between the exposure head 106 and the photoconductor drum 102. FIG. 2B is a view illustrating the internal configuration of the exposure head 106 and a state where a light flux from the exposure head 106 is condensed to the photoconductor drum 102 by a rod lens array 203. As shown in FIG. 2A, the exposure head 106 is mounted to the image forming apparatus by a mounting member (not shown) at a position facing the photoconductor drum 102 above the photoconductor drum 102 that rotates in the arrow direction (FIG. 1).

As shown in FIG. 2B, the exposure head 106 is made up of a drive circuit board 202, light emitting devices 400 mounted on the drive circuit board 202, the rod lens array 203, and a housing 204. The rod lens array 203 and the drive circuit board 202 are attached to the housing 204. As shown in FIGS. 2A and 2B, the rod lens array 203 is disposed between the light emitting devices 400 and the photoconductor drum 102. The rod lens array 203 is provided along the longitudinal direction of the drive circuit board 202 and condense light fluxes emitted from the light emitting device group onto the photoconductor drum 102. In a factory, assembling and adjustment work is performed on the exposure head 106 alone, and focus adjustment and light amount adjustment are performed. Here, assembling and adjustment is performed such that the distance between the photoconductor drum 102 and the rod lens array 203 becomes a predetermined distance and the distance between the rod lens array 203 and the light emitting devices 400 becomes a predetermined distance. Thus, light from the light emitting devices 400 forms an image on the photoconductor drum 102. For this reason, during focus adjustment in a factory, the mounting position of the rod lens array 203 is adjusted such that the distance between the rod lens array 203 and the light emitting devices 400 becomes the predetermined value. During light amount adjustment in a factory, lower electrodes of a light emitting device 401 (described later) are driven, and adjustment of a voltage (described later) to be applied to the light emitting device is performed such that light condensed onto the photoconductor drum 102 via the rod lens array 203 becomes a predetermined amount of light.

Figure 3A:
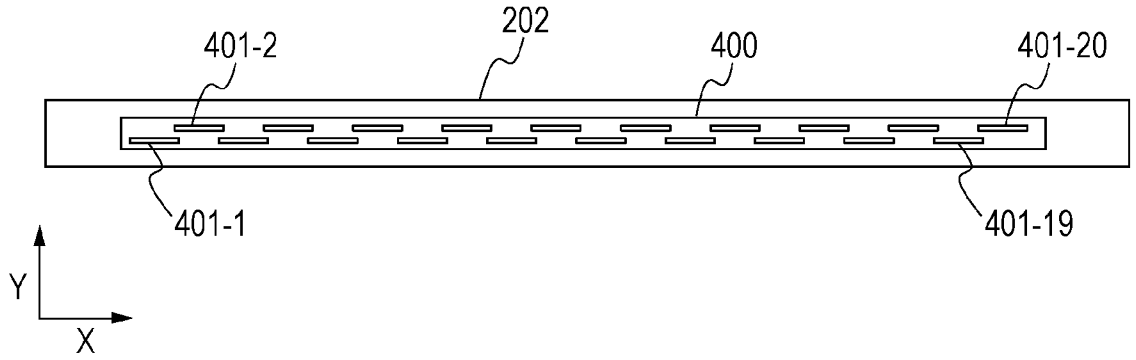
FIG. 3A is a schematic diagram of the exposure head according to the embodiment.
Figure 3B:
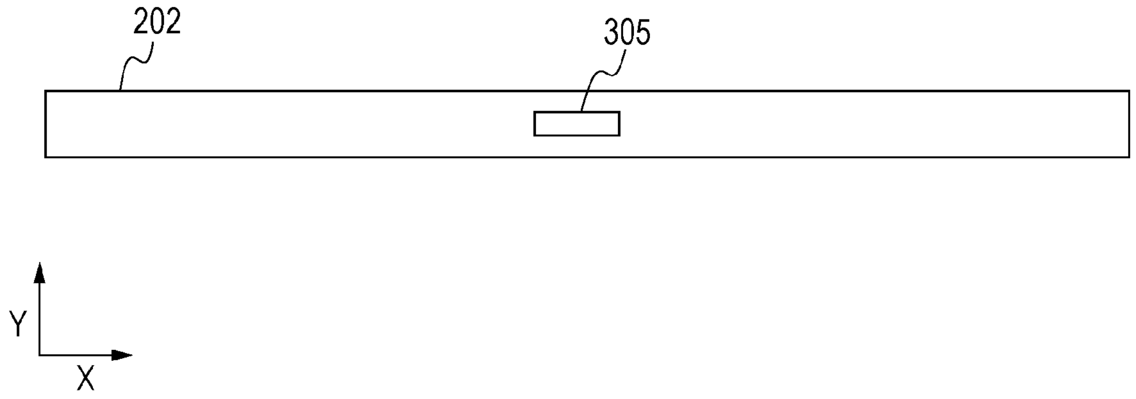
FIG. 3B is a schematic diagram of the exposure head according to the embodiment.

FIGS. 3A and 3B are diagrams illustrating the drive circuit board 202 and the light emitting devices 400 mounted on the drive circuit board 202. FIG. 3A is a schematic diagram showing the configuration of a surface of the drive circuit board 202, on which the light emitting devices 400 are mounted. FIG. 3B is a schematic diagram showing the configuration of a surface (second surface) of the drive circuit board 202 across from the surface (first surface) on which the light emitting devices 400 are mounted.

As shown in FIG. 3A, the light emitting devices 400 mounted on the drive circuit board 202 that is a second circuit board have a configuration such that light emitting devices 401-1 to 401-20 that are independent chips are disposed in two rows in a staggered manner along the longitudinal direction of the drive circuit board 202. In other words, on the drive circuit board 202 (on the second circuit board), the odd-numbered light emitting devices 401-1, . . . and the even-numbered light emitting devices 401-2, . . . are arranged at different positions in the rotation direction of the photoconductor drum 102. Hereinafter, the light emitting devices 401-1 to 401-20 will be described as the light emitting devices 400 when collectively referred. In FIG. 3A, an up and down direction represents the rotation direction of the photoconductor drum 102, which is a first direction, and a horizontal direction represents the longitudinal direction that is a second direction orthogonal to the first direction. The longitudinal direction is also an intersecting direction that intersects with the rotation direction of the photoconductor drum 102. Each of the light emitting devices 400 includes 748 lower electrodes (described later) in total. In the present embodiment, the lower electrodes are disposed one by one at intervals of 21.16 μm (≈2.54 cm/1200 dot). As a result, the array distance from one end to the other end of the 748 lower electrodes in one light emitting device is about 15.8 mm (≈21.16 μm×748). The light emitting devices 400 are made up of the 20 light emitting devices 401-1 to 401-20. The number of lower electrodes in the light emitting devices 400 is 14,960 (=748 electrodes×20 chips), and the light emitting devices 400 are capable of performing exposure for an image width of about 316 mm about 15.8 mm×20 chips) in the longitudinal direction.

As shown in FIG. 3B, a connector 305 is mounted on the surface of the drive circuit board 202 across from the surface on which the light emitting devices 400 are mounted. The connector 305 is a connector for connecting lines for power supply and control signals for controlling the light emitting devices 400 from the image controller unit 700 (not shown). The light emitting devices 401-1 to 401-20 are driven via the connector 305.

Figure 4:
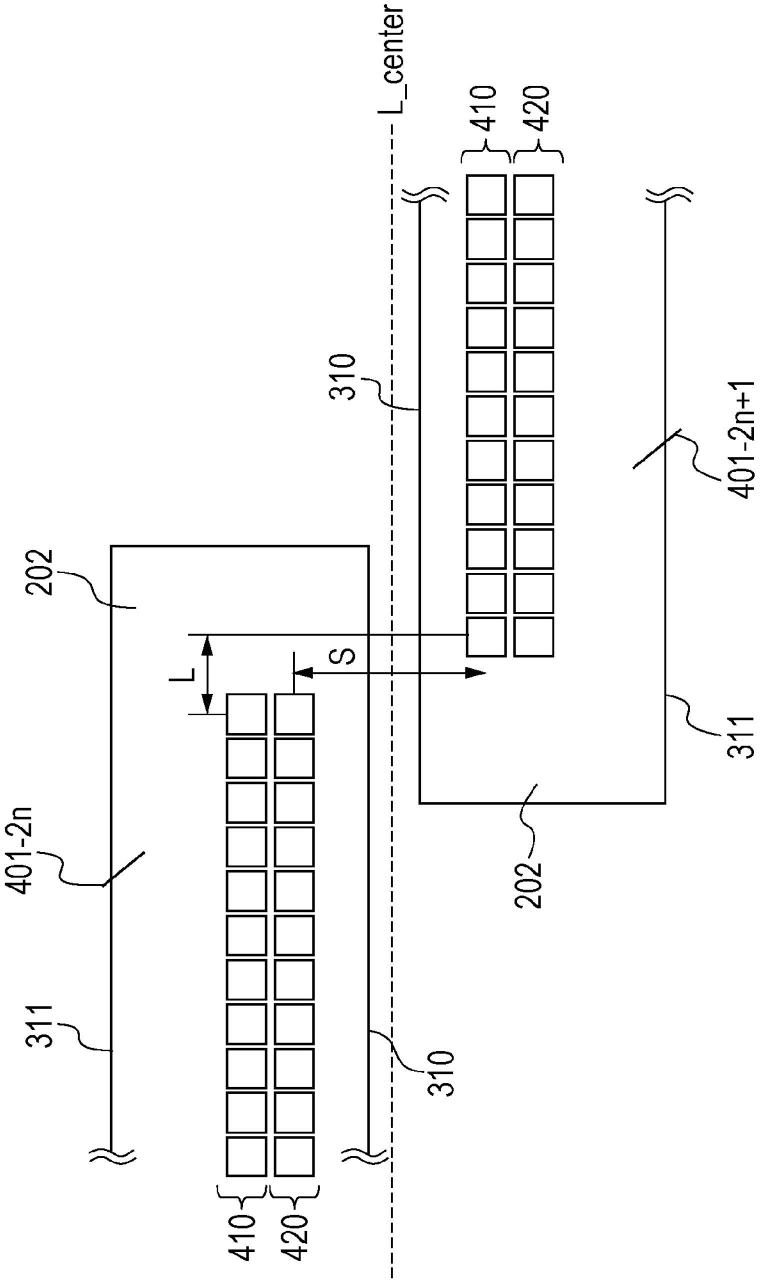
FIG. 4 is a diagram showing a layout relationship on a printed circuit board between a plurality of light emitting devices according to a first embodiment.

FIG. 4 is a diagram showing a state of a boundary part between the chips of the light emitting devices 401 disposed in two rows in the longitudinal direction. The horizontal direction is the longitudinal direction of the light emitting devices 401 of FIG. 3A. FIG. 4 shows the boundary part between the chips of the light emitting devices 401 (a part at which the ends of the chips overlap in the longitudinal direction (overlap part)). At the boundary part between the light emitting device 401-2$n$ and the light emitting device

401-2*n*+1 as well, the pitch of the lower electrodes (the distance between the centers of the two lower electrodes) at the ends between different light emitting devices is substantially 21.16 μm that is the pitch of the resolution 1200 dpi.

Figure 5:
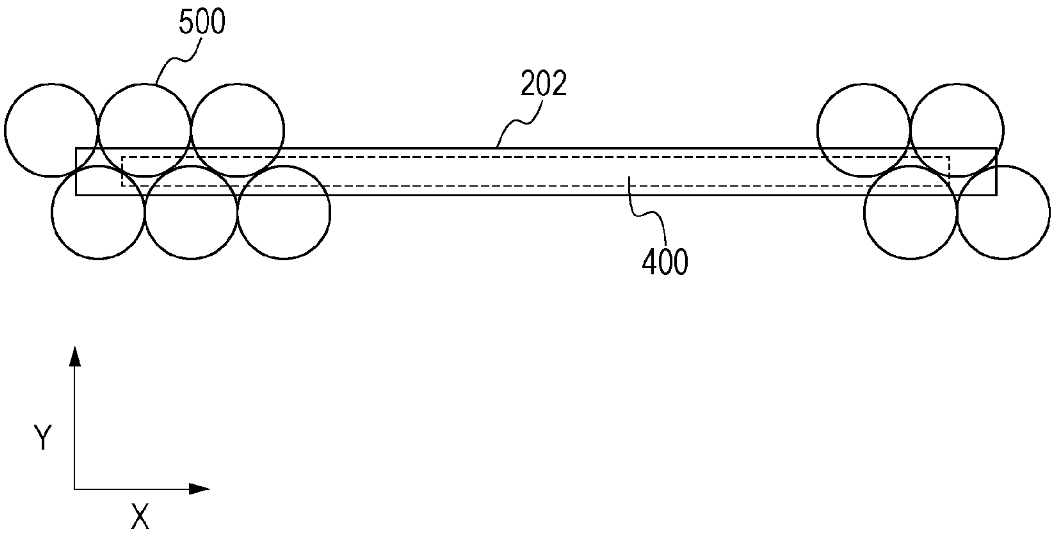
FIG. 5 is a top view showing a layout relationship between a rod lens array and the printed circuit board according to the embodiment.

FIG. 5 is a top view showing a layout relationship between the rod lens array 203 and the drive circuit board 202 according to the present embodiment. The rod lens array 203 is a lens group in which rod lenses of which the optical axis extends in a Z direction are arranged as shown in FIG. 5. The plurality of rod lenses 500 is disposed over the length greater than or equal to the length of the light emission region of the light emitting devices 401-1 to 401-20 mounted on the drive circuit board 202. Other than the rod lens array 203, a microlens array or the like may be used.

Configuration of Light Emitting Device

Figure 6:
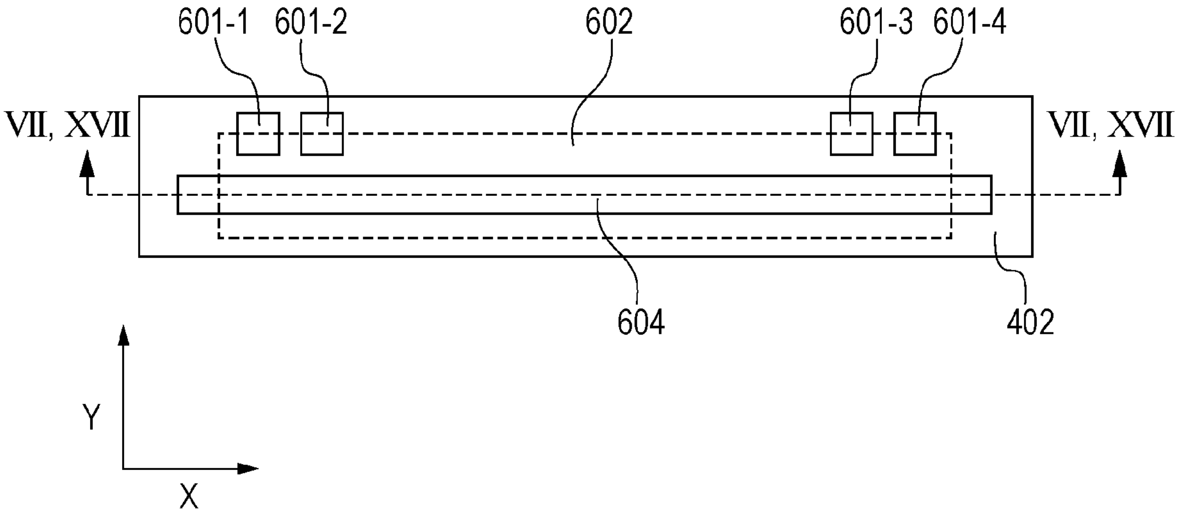
FIG. 6 is a top view of a light emitting device according to the embodiment.

FIG. 6 is a schematic diagram showing the internal configuration of the light emitting device 401. Here, as shown in FIG. 6, the longitudinal direction of the light emitting device 401 is defined as X direction, and the transverse direction of the light emitting device 401 is defined as Y direction. Here, the Y direction is the rotation direction of the photoconductor drum 102, in other words, the moving direction of a photo surface (photoconductor surface) of the rotating photoconductor drum 102. The X direction is a direction substantially orthogonal to the Y direction, that is, the rotation direction of the photoconductor drum 102. The Y direction is a direction substantially parallel to the rotation direction of the photoconductor drum 102. The substantially orthogonal direction permits the inclination of about ±1° with respect to an angle of 90°. The substantially parallel direction permits the inclination of about ±1° with respect to 0° formed therebetween. In the light emitting device 401, wire bonding pads (hereinafter, referred to as WB pads) 601-1, 601-2, 601-3, 601-4 are formed on a silicon circuit board 402 that is a first circuit board. A circuit portion 602 (dashed line) that is a drive portion is incorporated in the silicon circuit board 402. An analog drive circuit, a digital control circuit, or a component that includes both may be used as the circuit portion 602. Supply of power to the circuit portion 602 and input and output of signals and the like to and from outside the light emitting device 401 are performed via the WB pads.

The light emitting device 401 according to the present embodiment includes a linear light emission region 604 extending along the rotational axis direction of the photoconductor drum. The light emission region 604 includes a positive electrode, a negative electrode, and a light emitting layer 450 (described later). The light emission region 604 is a region that produces light when there is a potential difference between the positive electrode and the negative electrode.

A process technology for forming an integrated circuit has been developed, and the silicon circuit board 402 has been already used as circuit boards for various integrated circuits, so it is beneficial to form a high-speed, high-functionality circuit in high density. In addition, a large-diameter wafer has been distributed for silicon circuit boards, so it is beneficial that a large-diameter wafer is on the market and available at low cost.

The light emitting device 401 will be further described in detail with reference to FIGS. 7A to 8B. An X direction in FIGS. 7A to 8B represents the longitudinal direction of the exposure head. A Z direction is a direction in which layers of a layer structure (described later) are laminated (lamination direction).

Figure 7A:
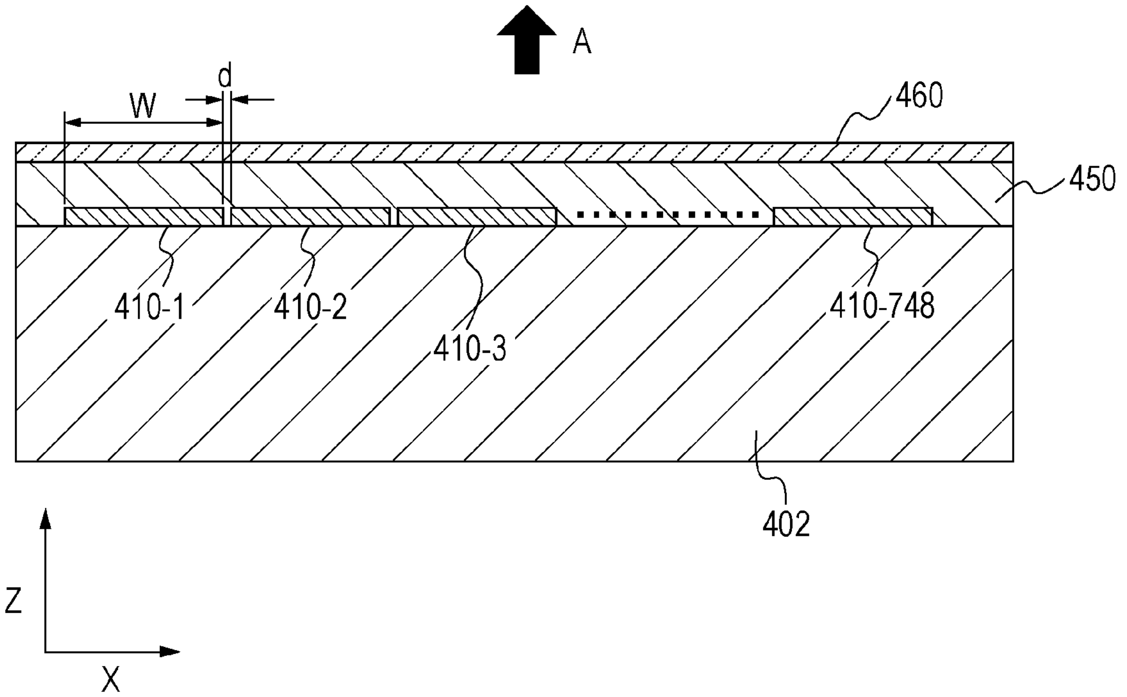
FIG. 7A is a schematic sectional view of the light emitting device according to the first embodiment.
Figure 7B:
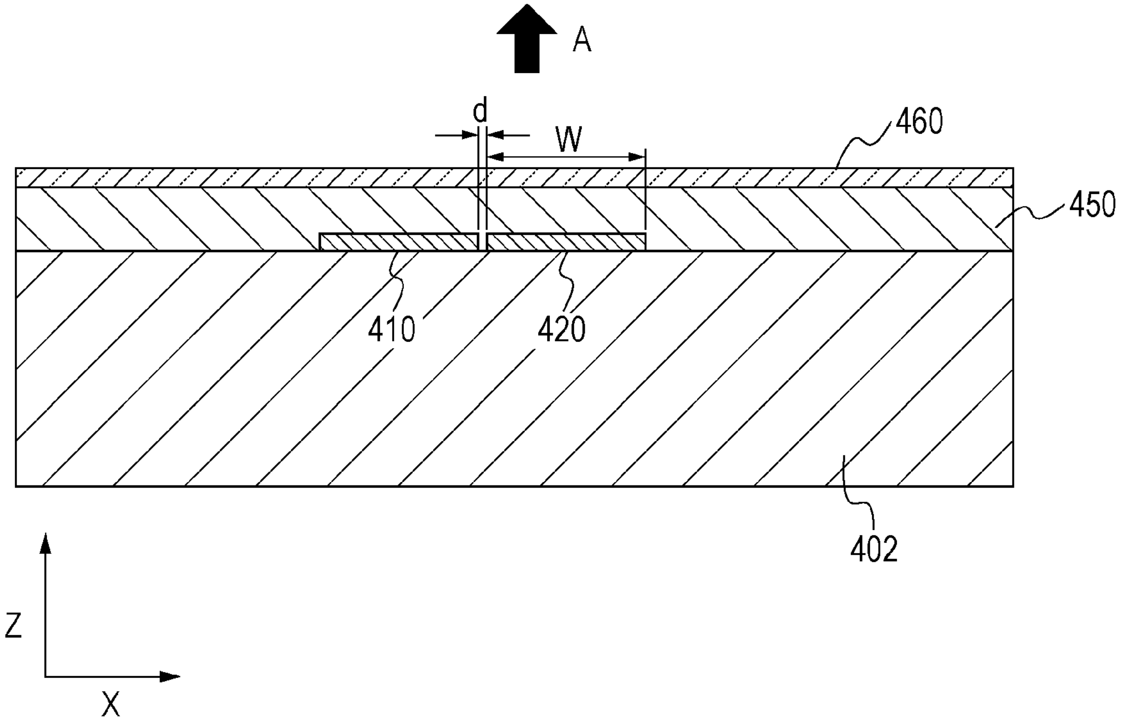
FIG. 7B is a schematic sectional view of the light emitting device according to the first embodiment.
Figure 8A:
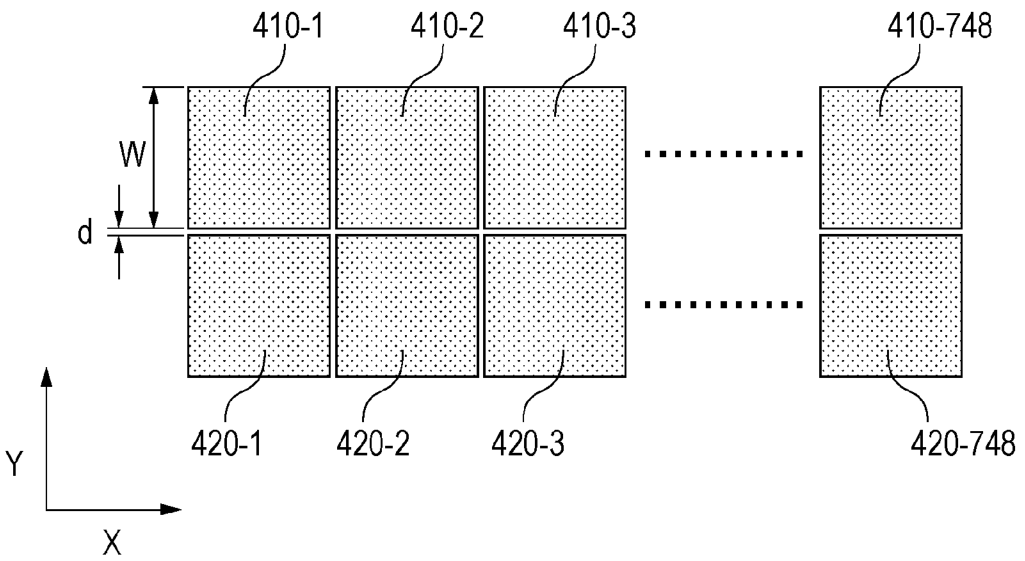
FIG. 8A is a diagram showing an array of lower electrodes according to the first embodiment.
Figure 8B:
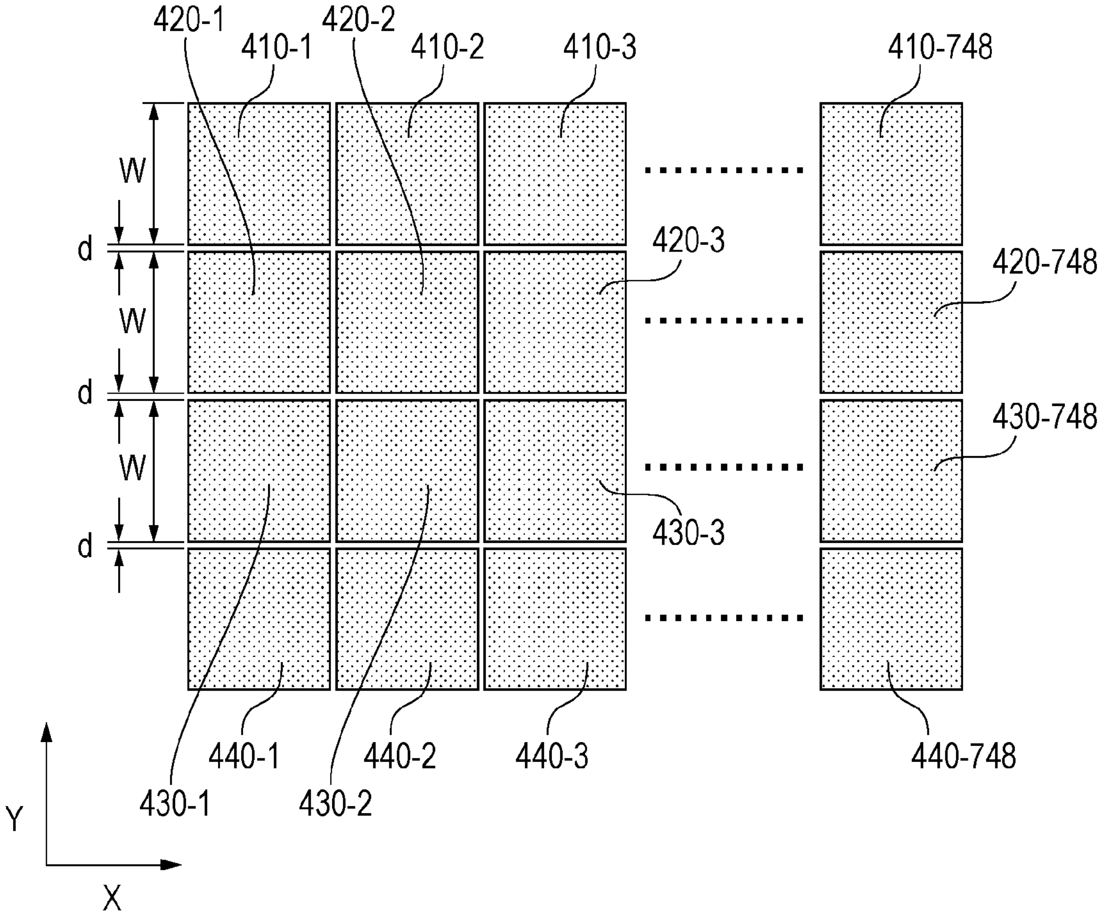
FIG. 8B is a diagram showing an array of lower electrodes according to the first embodiment.

FIGS. 7A and 7B are enlarged relevant part diagrams of a schematic sectional view taken along the line VII, XVII-VII, XVII in FIG. 6. FIGS. 8A and 8B are schematic diagrams of lower electrodes 410-1 to 410-748 (described later) when viewed in the Z direction. As shown in FIGS. 7A and 7B, the light emitting device 401 includes the silicon circuit board 402, the lower electrodes 410-1 to 410-748, lower electrodes 420-1 to 420-748, the light emitting layer 450, and an upper electrode 460.

The silicon circuit board 402 is a drive circuit board in which a drive circuit that includes drive portions respectively corresponding to the lower electrodes 410-1 to 410-748 (described later) is formed in a manufacturing process.

As shown in FIG. 5, the lower electrodes 410-1 to 410-748 (negative electrodes) are a plurality of electrodes formed in a layer (second electrode layer) on the silicon circuit board 402. The lower electrodes 410-1 to 410-748 are respectively formed on the plurality of drive portions incorporated in the silicon circuit board 402 by using an Si integrated circuit processing technology together with the manufacturing process for manufacturing the silicon circuit board 402. The lower electrodes 410-1 to 410-748 are preferably made of a metal with a high reflectance to the emission wavelength of the light emitting layer 450 (described later). Therefore, the lower electrodes 410-1 to 410-748 preferably contain silver (Ag), aluminum (Al), an alloy of them, a silver-magnesium alloy, or the like.

As shown in FIGS. 7A to 8B, the lower electrodes 410-1 to 410-748 are electrodes provided in correspondence with pixels in the X direction. In other words, each of the lower electrodes 410-1 to 410-748 is an electrode provided to form one pixel. The lower electrodes 410-1 to 410-748 are defined as a first electrode array.

The width W of the lower electrodes 410-1 to 410-748 in the X direction in the present embodiment corresponds to the width of one pixel. A clearance d is a distance between the lower electrodes in the X direction. Since the lower electrodes 410-1 to 410-748 are formed with the clearance d on the silicon circuit board 402, the plurality of drive portions formed in the silicon circuit board 402 are capable of respectively individually controlling the voltages of the lower electrodes 410-1 to 410-748. An organic material of the light emitting layer 450 is filled in the clearance d, and the lower electrodes are partitioned by the organic material.

In the light emitting device according to the present embodiment, the width W of each of the lower electrodes 410-1 to 410-748 is set to a nominal dimension of 20.90 m, and the clearance d is set to a nominal dimension of 0.26 μm. In other words, the light emitting device according to the present embodiment includes one lower electrode 410 for every 21.16 μm in the X direction. Since 21.16 μm is the size of one pixel in 1200 dpi, the width of the lower electrode 410 in the X direction of each lower electrode is a size equivalent to one pixel of the output resolution of the image forming apparatus according to the present embodiment. A process rule in the light emitting device according to the present embodiment is about 0.2 μm and is high in precision, and it is possible to form a width of dl with a resolution of 0.26 μm.

The width of each of the lower electrodes 410-1 to 410-748 in the Y direction that is the rotation direction of the photoconductor drum is also W. In other words, the lower electrodes 410-1 to 410-748 according to the present embodiment each have a shape of a square having side 20.90 μm, and the area of the lower electrode 410 is 436.81 $\mu m^2$. This occupies about 97.6% of the area of one pixel, that is, 447.7456 $\mu m^2$. An organic luminescent material is less in the amount of light than an LED. In contrast, when the lower electrodes in a square shape are formed on the silicon circuit board 402 with a reduced distance between the adjacent lower electrodes as described above, it is possible to ensure the light emitting area for obtaining the amount of light to such an extent that the potential of the photoconductor drum can be changed. It is desirable to ensure the lower electrode area that is 90% or more of the occupied area of one pixel. Therefore, it is desirable to form the width of one side of the lower electrode 410 by about 20.07 μm or greater for the image forming apparatus with an output resolution of 1200 dpi, and it is desirable to form the width of one side of the lower electrode 410 by about 10.04 μm or greater for the image forming apparatus with an output resolution of 2400 dpi.

On the other hand, an upper limit of the occupied area of the lower electrode 410 should be set in accordance with the transmittance of the rod lens array and the upper electrode (described later) and, in the present embodiment, the upper limit is set to 110% of the occupied area of one pixel. When the occupied area of the lower electrode 410 is designed to be greater than 110% of the occupied area of one pixel, the size of a pixel formed at the time of exposing a photoconductor drum with high sensitivity to light may significantly exceed the resolution, so the upper limit value of the occupied area of the lower electrode 410 is set to 110%. Therefore, it is desirable to form the width of one side of the lower electrode 410 by about 22.19 μm or less for the image forming apparatus with an output resolution of 1200 dpi, and it is desirable to form the width of one side of the lower electrode 410 by about 11.10 μm or less for the image forming apparatus with an output resolution of 2400 dpi. In other words, the range of the occupied area of the lower electrode for the occupied area of one pixel is preferably higher than or equal to 90% and lower than or equal to 110%.

The shape of the lower electrode is not limited to a square shape and may be a shape, such as a polygonal shape more than a quadrilateral shape, a circular shape, and an elliptical shape, as long as light with an exposure region size corresponding to the output resolution of the image forming apparatus is emitted and the quality of an output image satisfies the design specifications of the image forming apparatus by that light.

As shown in FIG. 8A, the light emitting device 401 according to the present embodiment includes lower electrodes 420-1 to 420-748 in addition to the lower electrodes 410-1 to 410-748. The lower electrodes 420-1 to 420-748, as well as the lower electrodes 410-1 to 410-748, are a plurality of electrodes formed in a layer (second electrode layer) on the silicon circuit board 402. The lower electrodes 420-1 to 420-748 are defined as a second electrode array. In other words, the light emitting device 401 includes the lower electrodes arranged in a two-dimensional array. The size, shape, and layout in the X direction of the lower electrodes 420-1 to 420-748 are similar to those of the lower electrodes 420-1 to 420-748, so the description is omitted.

The lower electrodes 420-1 to 420-748 (second electrode array) are disposed with the clearance d from the lower electrodes 410-1 to 410-748 (first electrode array) in the Y direction. The lower electrode 420-1 is disposed adjacent to the lower electrode 410-1 in the Y direction. Similarly, the lower electrode 420-2 to the lower electrode 420-748 are respectively disposed adjacent to the lower electrode 410-2 to the lower electrode 410-748. As in the case of the present embodiment, it is not always necessary to design the lower electrodes such that the distance between the lower electrodes in the X direction is equal to the distance between the lower electrodes in the Y direction; however, it is desirable to design the lower electrodes such that the distances between the lower electrodes in both directions are equal to each other in order to efficiently arrange the lower electrodes in a predetermined area. In the present embodiment, the light emitting device that includes two rows of electrode arrays is illustrated for the sake of easy description; however, as shown in FIG. 8B, a selected number of rows greater than or equal to three rows of electrode arrays may be adopted. For example, as in the case of the above, lower electrodes 430-1 to 430-748 may be respectively disposed adjacent to the lower electrodes 420-1 to 420-748 and lower electrodes 440-1 to 440-748 may be further respectively disposed adjacent to the lower electrodes 430-1 to 430-748. Hereinafter, for the sake of easy description, the light emitting device that includes the lower electrode 410-1 to the lower electrode 410-748 and the lower electrode 420-1 to the lower electrode 420-748 will be described as an example.

When the lower electrode 410-1 and the lower electrode 420-1 are driven at the same time, the center positions of areas on the photoconductor drum 102, exposed by driving the electrodes, shift by W+d in the rotation direction of the photoconductor drum 102. The image forming apparatus according to the present embodiment exposes a region corresponding to one pixel in the output resolution of the image forming apparatus by driving the plurality of lower electrodes (for example, the lower electrode 410-1 and the lower electrode 420-1) adjacent in the rotation direction of the photoconductor drum 102. For this reason, a region corresponding to one pixel can be exposed to light multiple times (multiple exposure) by providing a time difference between the timing of application of a voltage to the lower electrode 410-1 and the timing of application of a voltage to the lower electrode 420-1 in accordance with the rotation speed of the photoconductor drum 102.

Next, the light emitting layer 450 will be described. The light emitting layer 450 is formed so as to be laminated on the silicon circuit board 402 on which the lower electrodes 410-1 to 410-748 and the lower electrodes 420-1 to 420-748 are formed. In other words, the light emitting layer 450 is laminated on the lower electrodes 410-1 to 410-748 and the lower electrodes 420-1 to 420-748 in an area where the lower electrodes 410-1 to 410-748 and the lower electrodes 420-1 to 420-748 are formed. The light emitting layer 450 is laminated on the silicon circuit board 402 in an area where the lower electrodes 410-1 to 410-748 and the lower electrodes 420-1 to 420-748 are not formed. In the present embodiment, in the light emitting device 401, the light emitting layer 450 is formed so as to bridge over all the lower electrodes 410-1 to 410-748 and the lower electrodes 420-1 to 420-748; however, the embodiment is not limited thereto. For example, the light emitting layer 450 may be formed so as to be laminated separately on each of the lower electrodes as in the case of the lower electrodes 410-1 to 410-748 and the lower electrodes 420-1 to 420-748, or the lower electrodes 410-1 to 410-748 and the lower electrodes 420-1 to 420-748 may be divided into a plurality of groups and one light emitting layer may be laminated on the lower electrodes that belong to the same group for each of the divided groups.

For example, an organic material may be used for the light emitting layer 450. The light emitting layer 450 that is an organic EL film is a lamination structure that includes functional layers, such as an electron transport layer, a hole transport layer, an electron injection layer, a hole injection layer, an electron block layer, and a hole block layer. Other than an organic material, an inorganic material may be used for the light emitting layer 450.

The upper electrode 460 (positive electrode) is laminated on the light emitting layer 450 (as a first electrode layer). The upper electrode 460 is an electrode capable of transmitting (transmittable) light of the emission wavelength of the light emitting layer 450. Therefore, the upper electrode 460 according to the present embodiment adopts a material containing indium tin oxide (ITO) as a transparent electrode. An electrode made of indium tin oxide has a transmittance of 80% or higher to light in a visible light range, so the electrode is suitable as the electrode of an organic EL device.

The upper electrode 460 is formed on the side across at least the light emitting layer 450 from the lower electrodes 410-1 to 410-748 and the lower electrodes 420-1 to 420-748. In other words, the light emitting layer 450 is disposed in the Z direction between the upper electrode 460 and the lower electrodes 410-1 to 410-748 and between the upper electrode 460 and the lower electrodes 420-1 to 420-748, and, when the lower electrodes 410-1 to 410-748 and the lower electrodes 420-1 to 420-748 are projected onto the upper electrode 460 in the Z direction, the region in which the lower electrodes 410-1 to 410-748 and the lower electrodes 420-1 to 420-748 are formed fits into the region in which the upper electrode 460 is formed. A transparent electrode does not need to be laminated all over the light emitting layer 450; however, in order to emit light produced in the light emitting layer 450 to be efficiently emitted to outside the light emitting device, the occupied area of the upper electrode 460 to the occupied area of one pixel is preferably higher than or equal to 100% and more preferably higher than or equal to 120%. The upper limit value of the occupied area of the upper electrode 460 is optionally designed by the areas of the silicon circuit board 402 and the light emitting layer 450. Wiring lines may be disposed in an area other than the area through which light is transmitted in the upper electrode 460.

The upper electrode 460 according to the present embodiment is a positive electrode provided in common for the lower electrodes 410-1 to 410-748 and the lower electrodes 420-1 to 420-748; however, the upper electrode 460 may be provided individually for each of the lower electrodes 410-1 to 410-748 and the lower electrodes 420-1 to 420-748 or one upper electrode may be provided for each set of lower electrodes.

The drive circuit controls the potential of each of the lower electrodes 410-1 to 410-748 and the lower electrodes 420-1 to 420-748 in accordance with image data in order to generate a potential difference between the upper electrode 460 and selected lower electrodes of the lower electrodes 410-1 to 410-748 and the lower electrodes 420-1 to 420-748.

The light emitting device according to the present embodiment is a device with an emission system of a so-called top emission type. When a voltage is applied between the upper electrode 460 that is a positive electrode and each of the lower electrodes 410 and the lower electrodes 420 that are negative electrodes and, as a result, a potential difference is generated between both electrodes, electrons flow from the negative electrodes into the light emitting layer 450, and holes flow from the positive electrode into the light emitting layer 450. Then, the electrons and the holes recombine with each other in the light emitting layer 450, with the result that the light emitting layer 450 produces light. When the light emitting layer 450 produces light, light heading toward the upper electrode 460 transmits through the upper electrode 460 and exits from the light emitting device in the arrow A direction indicated in FIGS. 7A and 7B. Light heading from the light emitting layer 450 toward the lower electrodes 410 and the lower electrodes 420 is reflected on the lower electrodes 410 and the lower electrodes 420 toward the upper electrode 460, and the reflected light also transmits through the upper electrode 460 and exits from the light emitting device. There is a time difference in exit timing from the upper electrode 460 between light directly emitted from the light emitting layer 450 toward the upper electrode 460 and light reflected on the lower electrodes 410 and the lower electrodes 420 and emitted from the upper electrode 460; however, the thickness of the layer of the light emitting device is minimal, so emission of light can be regarded as substantially the same time.

When a transparent electrode made of indium tin oxide or the like is used as the upper electrode 460, an aperture ratio representing the light transmission ratio of the electrode can be made substantially equivalent to the transmittance of the upper electrode 460. In other words, since there is substantially no area, other than the upper electrode 460, that attenuates light or that blocks light, light produced from the light emitting layer 450 becomes emission light without being attenuated or blocked as much as possible.

As described above, when the lower electrodes 410-1 to 410-748 and the lower electrodes 420-1 to 420-748 are formed by high-precision Si integrated circuit processing technology, the lower electrodes 410-1 to 410-748 and the lower electrodes 420-1 to 420-748 can be disposed in high density. Therefore, almost all the area of light emitting portions 404 (here, the sum of the area of the lower electrodes 410-1 to 410-748 and the lower electrodes 420-1 to 420-748 and the area of the region between the mutually adjacent lower electrodes) can be allocated to the lower electrodes 410-1 to 410-748 and the lower electrodes 420-1 to 420-748. In other words, the exposure head has a high efficiency of use of the light emission region per unit area.

When a luminescent material susceptible to moisture, such as an organic EL layer and an inorganic EL layer, is used for the light emitting layer 450, it is desirable to seal against entry of moisture into the light emitting portions 404. As a sealing method, for example, a thin-film alone or a laminated sealing film made of a silicon oxide, a silicon nitride, and an aluminum oxide, is formed. A method excellent in performance of coating a structure, such as a step, is preferable as a method of forming a sealing film, and, for example, an atomic layer deposition method (ALD method) or the like may be used. The materials, configurations, formation methods, and the like of a sealing film are one examples, and the embodiment is not limited to the above-described examples. Suitable ones may be selected as needed.

Shape of Exposure Regions of Multiple Exposure

Figure 9A:
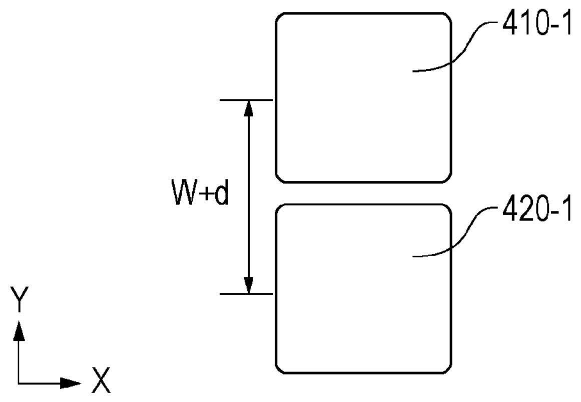
FIG. 9A is a diagram illustrating a state of multiple spots according to the first embodiment.
Figure 9B:
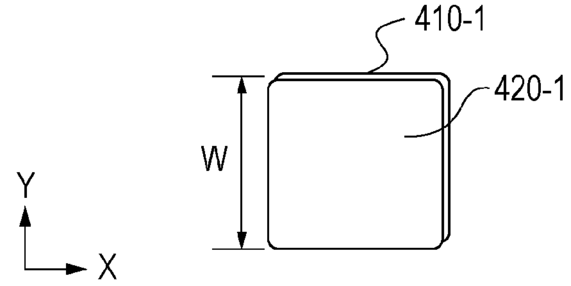
FIG. 9B is a diagram illustrating a state of multiple spots according to the first embodiment.
Figure 9C:
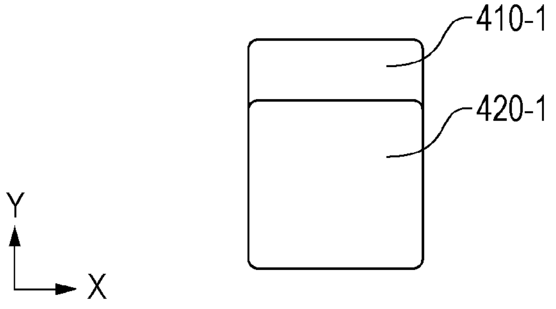
FIG. 9C is a diagram illustrating a state of multiple spots according to the first embodiment.

FIGS. 9A to 9C show positional relationships between exposure regions (spots) at the time of multiple exposure. FIGS. 9A to 9C show exposure regions on the exposure head 106 exposed to light by driving a lower electrode 410-*n* (n is a natural number of $1 \leq n \leq 748$) and a lower electrode 420-*n* adjacent to the lower electrode 410-*n* in the Y direction. In other words, FIGS. 9A to 9C show the exposure regions of the two lower electrode lower electrode 410-*n* and lower electrode 420-*n* arranged in the Y direction for the nth lower electrodes out of the 748 lower electrodes arranged in the X direction. When a voltage for causing the light emitting layer 450 to produce light is applied substantially at the same time to the lower electrode 410-*n* and the lower electrode 420-*n* in the Y direction of the silicon circuit board 402, an exposure region corresponding to the lower electrode 410-*n* and an exposure region corresponding to the lower electrode 420-*n* are at different positions in the Y direction as shown in FIG. 9A. The positions of the exposure regions are similar to the layout relationship between the lower electrode 410-*n* and the lower electrode 420-*n* in the Y direction. In other words, the center-to-center distance between the exposure regions in the Y direction is W (μm)+d (μm).

FIG. 9B shows a state of exposure regions when timing to apply a voltage (hereinafter, referred to as turn-on timing) to the lower electrode 420-*n* disposed so as to expose a region on the downstream side with respect to the lower electrode 410-*n* in the rotation direction of the photoconductor drum 102 in accordance with the rotation direction and rotation speed Vdr (mm/s) of the photoconductor drum 102 is delayed in accordance with the expression (1). Timing T at which the positions of the exposure regions formed on the photoconductor drum 102 coincide with each other is controlled in accordance with a delay time Tdelay obtained from the expression (1).

$$T\text{delay}=((W+d)\div 1000)\ \text{Vdr} \quad (1)$$

In the present embodiment, a light emission signal is generated such that a maximum value Tw of light emission time of each of the lower electrodes corresponding to pixels is equal to a time corresponding to one-line interval in the Y direction, and the expression (2) is expressed by resolution (for example, 1200 dpi) and rotation speed Vdr.

$$\text{Tw}=(25.4\div 1200)\div \text{Vdr} \quad (2)$$

It is possible to perform exposure at substantially the same position on the photoconductor drum 102 by using the lower electrode 410-*n* and the lower electrode 420-*n* through multiple exposure, so it is possible to increase the amount of light received by the photoconductor drum 102 in proportion to the number of lower electrodes arranged in the Y direction. To maintain such an advantage, a deviation between the positions of the exposure regions of the lower electrodes that perform multiple exposure on the photoconductor drum 102 is preferably small.

FIG. 9C shows an example in which the positions of exposure regions on the photoconductor drum 102 in multiple exposure deviate from each other. In this example, although the two exposure regions formed by multiple exposure do not completely overlap, the two exposure regions partially overlap. Ideally, the case where the two exposure regions substantially coincide with each other (completely overlap) as shown in FIG. 9B is preferable because a dot is formed sharply. However, when the exposure regions even partially overlap as shown in FIG. 9C, a necessary density can be obtained although the sharpness of dot degrades as compared to FIG. 9B.

For this reason, the time Tdelay falls within the range of the expression (3) for the size Ws (μm) of the exposure region even when there are variations due to control, the light emission timing is controlled within an allowable error ΔT of light emission timing.

$$\Delta T=(\text{Ws}\div 1000)\div \text{Vdr} \quad (3)$$

Control Blocks

Figure 10:
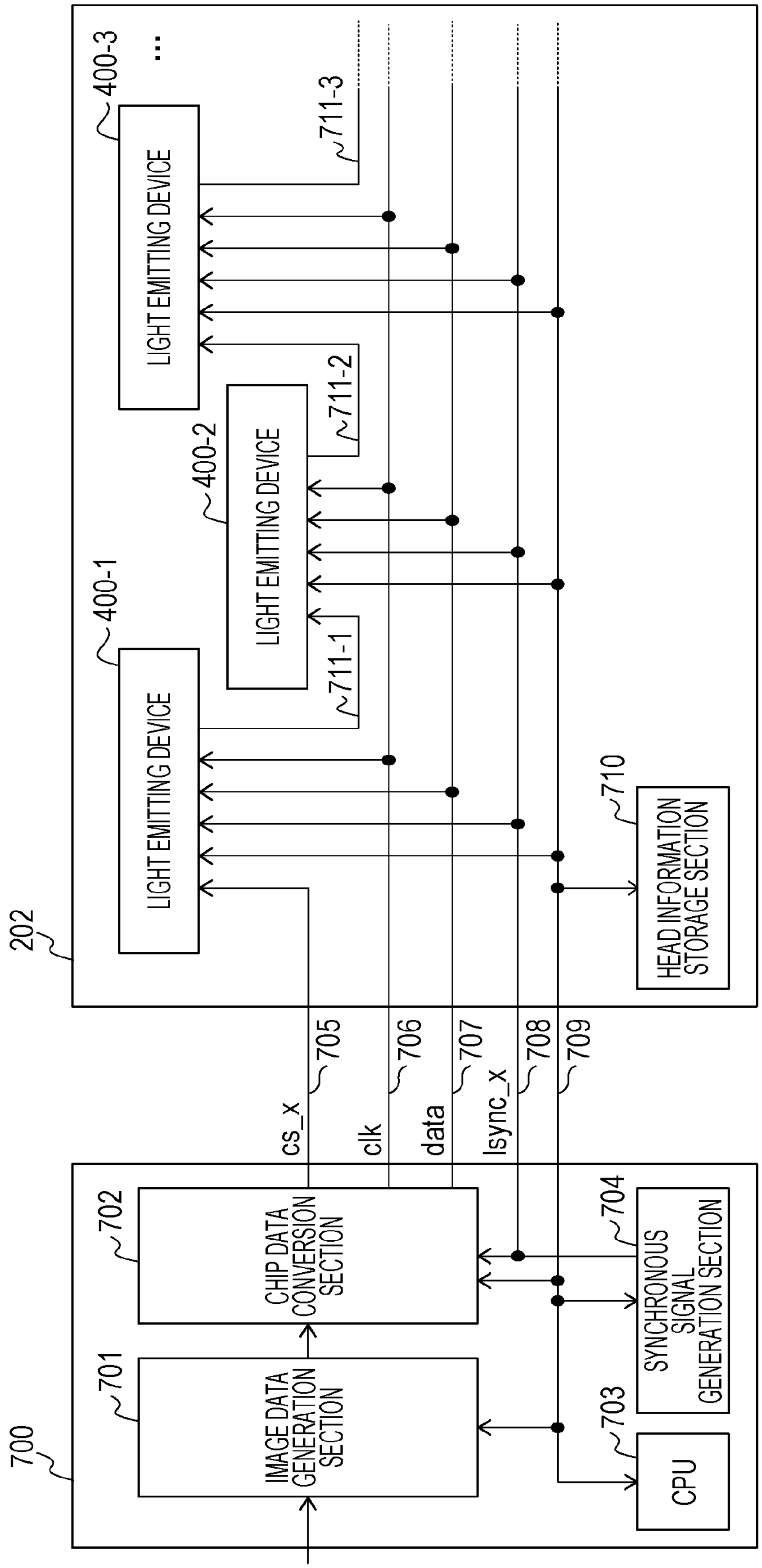
FIG. 10 is a block diagram of an image controller unit and a drive circuit board according to the first embodiment.

FIG. 10 shows a block diagram of the image controller unit 700 and a drive circuit board 202. Hereinafter, a chip select signal is represented by cs_x, a line synchronization signal is represented by lsync_x, a clock signal is represented by clk, and an image data signal is represented by data. In the present embodiment, for the sake of simple description, a single-color process will be described, and a similar process is processed in parallel for four colors.

Image Controller Unit

Image data generated by the scanner section 100 is input to the image controller unit 700, and the image controller unit 700 transmits control signals for controlling the drive circuit board 202. Image data input to the image controller unit 700 may be the above-described data generated in the scanner section 100 or may be data transferred via a network device (not shown) by a personal computer. The control signals include a chip select signal cs_x indicating an effective range of image data, a clock signal clk, an image data signal data, a line synchronization signal lsync_x indicating a partition for each line of image data, and a communication signal with a CPU 703. The signals are respectively transmitted to the light emitting device 401 in the drive circuit board 202 via a chip select signal line 705, a clock signal line 706, an image data signal line 707, a line synchronization signal line 708, and a communication signal line 709. The image controller unit 700 executes a process on image data and a process on print timing. An image data generation section 701 generates image data for print output by dithering at a resolution specified by the CPU 703 on image data received from the scanner section 100 or outside the image forming apparatus. In the present embodiment, dithering is executed at a resolution of, for example, 1200 dpi.

A synchronization signal generation section 704 generates a line synchronization signal lsync_x that is a second signal. The CPU 703 provides an instruction on a time interval of a signal period to the synchronization signal generation section 704 as one-line period for a predetermined rotation speed of the photoconductor drum 102. Here, one-line period is a period during which the surface of the photoconductor drum 102 moves by a pixel size (about 21.16 μm) of 1200 dpi in the rotation direction. For example, when printing is performed at a speed of 200 mm/s in the conveying direction of recording paper, the CPU 703 provides an instruction on a time interval to the synchronization signal generation section 704 with the one-line period set to 105.8 μs (the second and subsequent decimal places are omitted). The CPU 703 calculates a speed in the conveying direction by using a setting value (fixed value) of print speed (image forming speed) set in the control unit (not shown) that controls the speed of the photoconductor drum 102. A print speed is, for example, set according to the type of recording paper.

A chip data conversion section 702 divides one-line image data into pieces of image data for the respective light emitting devices 401 in synchronization with the line synchronization signal lsync_x generated in the synchronization signal generation section 704. The chip data conversion section 702 transmits each of the pieces of image data divided for the respective light emitting devices 401 to the drive circuit board 202 together with the clock signal clk and the chip select signal cs_x. The clock signal clk is a reference signal for control.

Drive Circuit Board

Next, the configuration of the drive circuit board 202 will be described. A head information storage section 710 is a storage device that stores head information, such as the quantity of light produced by each of the light emitting devices 401 and mounting position information, and is connected to the CPU 703 via the communication signal line 709. The clock signal line 706, the image data signal line 707, the line synchronization signal line 708, and the communication signal line 709 are connected to all the light emitting devices 401. The chip select signal line 705 is connected to the input of the light emitting device 401-1. The output of the light emitting device 401-1 is connected to the input of the light emitting device 401-2 via a signal line 711-1, and the output of the light emitting device 401-2 is connected to the input of the light emitting device 401-3 via a signal line 711-2. In this way, the chip select signal line 705 (or the signal line 711) is connected by a so-called daisy chain (cascade-connected) via the light emitting device 401. Each of the light emitting devices 401 controls the voltages of the lower electrodes of the light emitting device 401 in accordance with setting values set by the chip select signal line 705, the clock signal line 706, the line synchronization signal line 708, the image data signal line 707, and the communication signal line 709. Each of the light emitting devices 401 generates a chip select signal for the subsequent light emitting device 401.

Circuit Configuration in Light Emitting Device

Figure 11A:
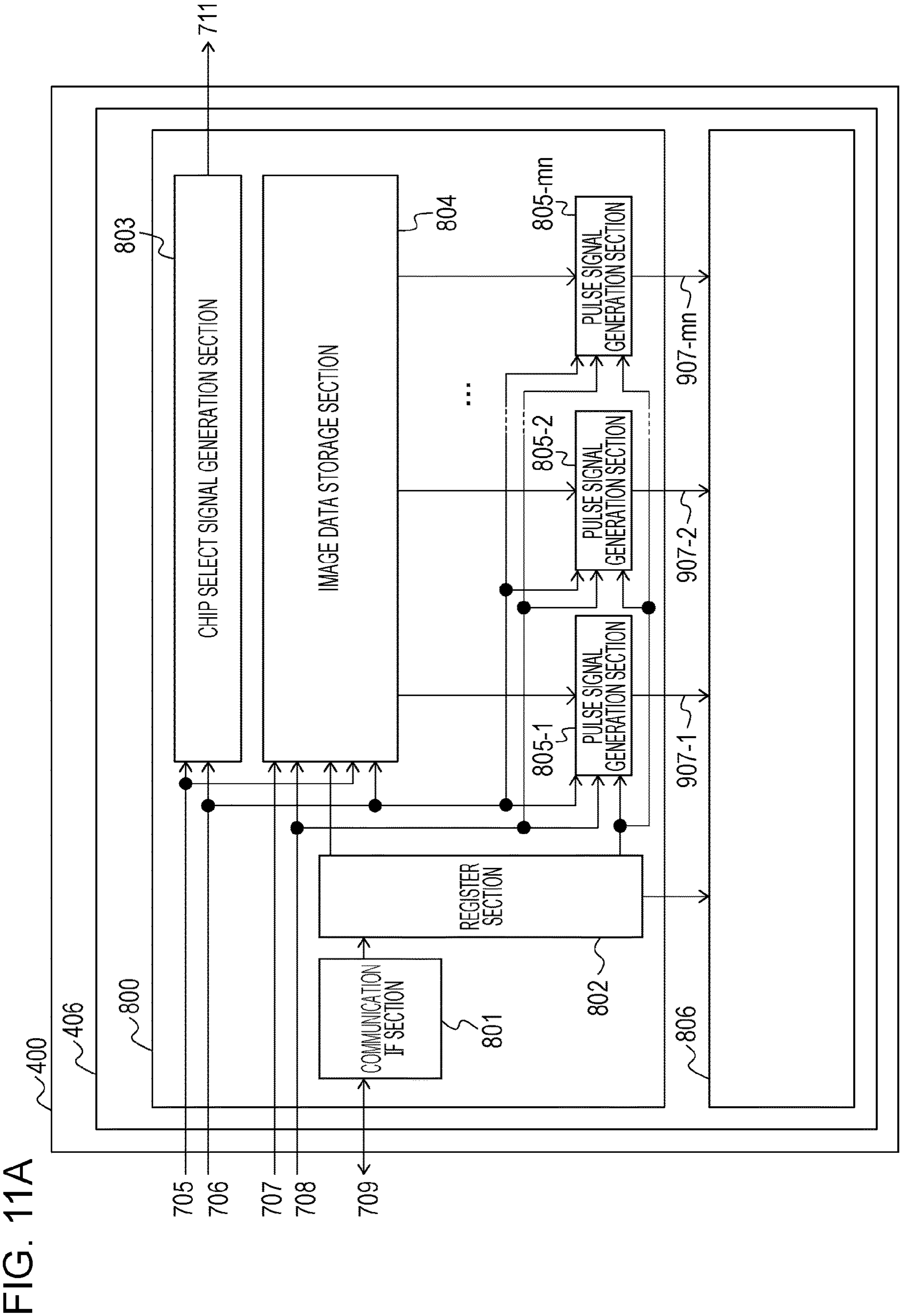
FIG. 11A is a circuit diagram in the light emitting device according to the embodiment.

FIG. 11A shows a circuit block diagram in the light emitting device 401. A circuit portion 406 in the light emitting device 401 includes a digital section 800 and an analog section 806. The digital section 800 has a function to generate a pulse signal for driving the lower electrode 410-*n* and the lower electrode 420-*n* in accordance with setting values set in advance by communication signals and various signals in synchronization with the clock signal clk and transmit the pulse signal to the analog section 806 via a pulse signal line 907. Here, various signals are the chip select signal cs_x, the image data signal data, and the line synchronization signal lsync_x. The digital section 800 has a function to generate a chip select signal for the subsequent light emitting device 401 from the input chip select signal cs_x.

Digital Section

A communication IF section 801 controls the writing and reading of setting values to a register section 802 in accordance with communication signals from the CPU 703. The register section 802 stores setting values necessary for operation (setting values set in advance). Examples of the setting values include exposure timing information used in an image data storage section 804, information on the width and phase of a pulse signal generated in a pulse signal generation section 805, and setting information of a drive voltage set in the analog section 806. Since a drive voltage can be derived from a resistance value between the lower electrode and the upper electrode and the range of the resistance value is known in advance, information on a drive current may be stored instead of setting information of a drive voltage. The register section 802 stores at least one of these pieces of information. A chip select signal generation section 803 that is a second generation section generates a chip select signal for the subsequent light emitting device 401 by delaying a chip select signal cs_x that is an input first signal and transmits the chip select signal via the signal line 711. The image data storage section 804 holds image data while an input chip select signal cs_x is effective and outputs the image data to the pulse signal generation section 805 in synchronization with the line synchronization signal lsync_x. Details will be described later.

The pulse signal generation section 805 generates a pulse signal based on the width information and phase information on the pulse signal set in the register section 802 according to the image data input from the image data storage section 804 and outputs the pulse signal to the analog section 806. Details will be described later. The analog section 806 generates a signal necessary to drive the lower electrode in accordance with the pulse signal generated in the digital section 800. Details will be described later.

Image Data Storage Section

Figure 11B:
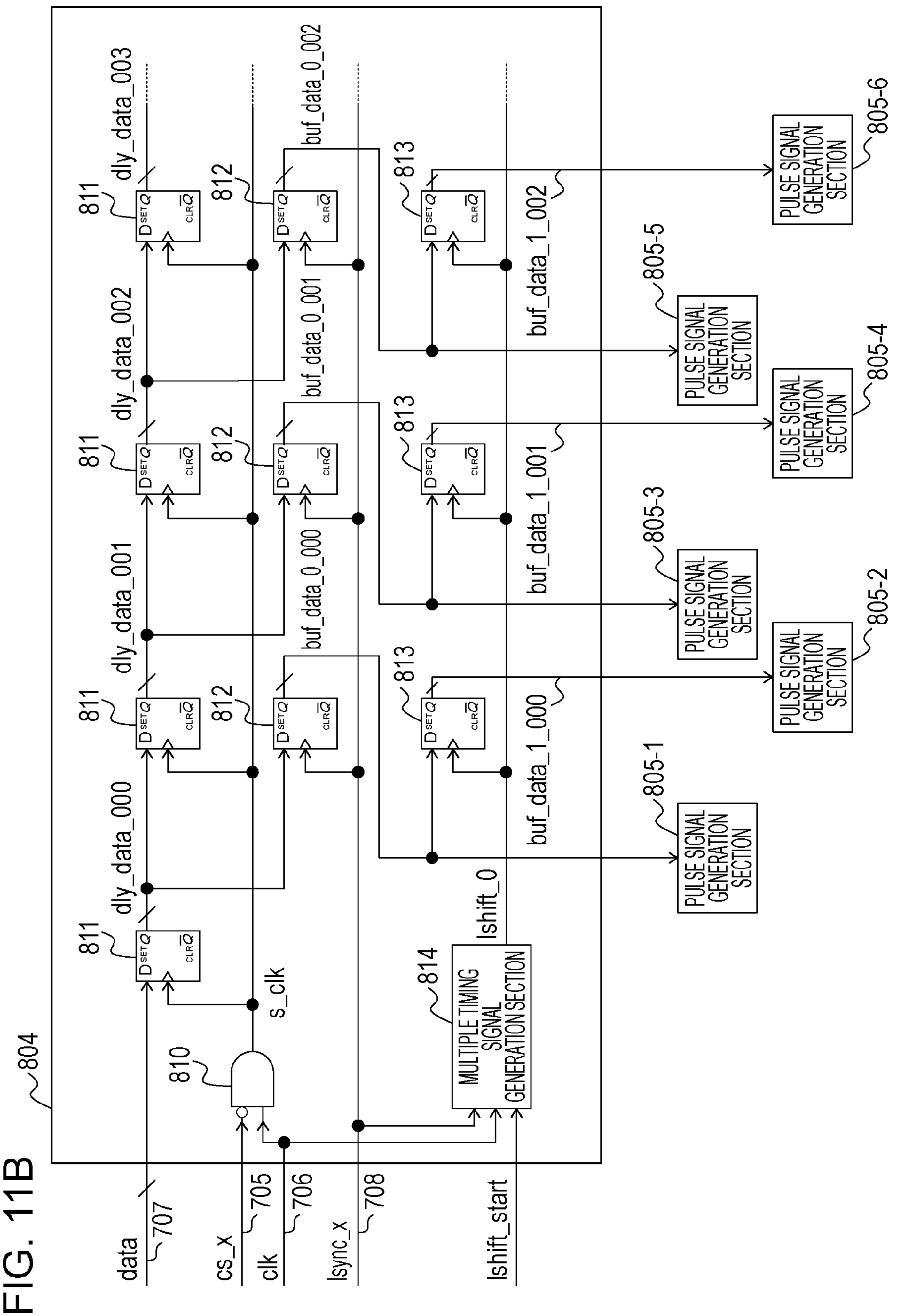
FIG. 11B is a circuit diagram in the light emitting device according to the embodiment.

Next, the operation of the image data storage section 804 will be described. The image data storage section 804 according to the first embodiment is incorporated in the light emitting device 401. An example in which the chip select signal cs_x and the line synchronization signal lsync_x are negative logic signals will be described; however, these signals may be positive logic. FIG. 11B is a circuit configuration diagram of the image data storage section 804. A clock gate circuit 810 outputs a logical product of an inversion signal of the chip select signal cs_x and the clock signal clk. The clock gate circuit 810 outputs the clock signal s_clk to a flip-flop circuit 811 only when the chip select signal cs_x is valid.

The flip-flop circuit 811 receives an image data signal data input to the image data storage section 804 as original input. The flip-flop circuits 811 equal in number (748 in the present embodiment) to an array of the lower electrodes 410 provided in the longitudinal direction of the light emitting device 401 are connected in series. The flip-flop circuits 811 operate in response to the clock signal s_clk sent from the clock gate circuit 810. The outputs of the flip-flop circuits 811 are respectively output to the adjacently connected next flip-flop circuits 811 and flip-flop circuits 812 as pieces of image data dly_data_000 to dly_data_747. The flip-flop circuits 811 and the flip-flop circuits 812 equal in number (748 in the present embodiment) to the lower electrodes 401 are provided in the longitudinal direction of a lower electrode array 401.

The flip-flop circuits 812 respectively receive the outputs of the flip-flop circuits 811 as inputs and operate in response to the line synchronization signal lsync_x. The outputs of the flip-flop circuits 812 are respectively output to the pulse signal generation sections 805 (805-1, 805-3, 805-5, . . . ) and flip-flop circuits 813 as pieces of image data buf_data_0_000 to buf_data_0_747. The flip-flop circuits 812 each function as a memory circuit, and the flip-flop circuits 812 provided for one lower electrode array (lower electrodes 401-1 to 401-748) function as a memory circuit group (or a first memory circuit group). The pulse signal generation sections 805-1, 805-3, 805-5, . . . function as a first pulse signal generation section group that generates first pulse signals. The pulse signal generation section 805-1 generates a pulse signal for driving the lower electrode 410-1. The pulse signal generation section 805-3 generates a pulse signal for driving the lower electrode 410-2. The pulse signal generation section 805-5 generates a pulse signal for driving the lower electrode 410-3.

The flip-flop circuits 813 each receive the output of the flip-flop circuit 812 as input and operate in response to a multiple exposure timing signal lshift_0. The outputs of the flip-flop circuits 813 are respectively output to the pulse signal generation sections 805 (805-2, 805-4, 805-6, . . . ) as pieces of image data buf_data_1_000 to buf_data_1_747. The flip-flop circuits 813 each function as a memory circuit, and the flip-flop circuits 813 provided for one lower electrode array (lower electrodes 402-1 to 402-748) function as a memory circuit group (or a second memory circuit group). The pulse signal generation sections 805-2, 805-4, 805-6, . . . function as a second pulse signal generation section group that generates second pulse signals. The pulse signal generation section 805-2 generates a pulse signal for driving the lower electrode 420-1. The pulse signal generation section 805-4 generates a pulse signal for driving the lower electrode 420-2. The pulse signal generation section 805-6 generates a pulse signal for driving the lower electrode 420-3.

A multiple exposure timing signal generation section 814 that is a first generation section generates a multiple exposure timing signal lshift_0 that is a timing signal in accordance with the line synchronization signal lsync_x, the clock signal clk, and a multiple timing setting signal lshift_start. In other words, the multiple exposure timing signal generation section 814 generates a multiple exposure timing signal lshif_0 for generating a pulse signal for the pulse signal generation sections 805-2, 805-4, . . . at different timing from the pulse signal generation sections 805-1, 805-3, . . . In the present embodiment, the multiple exposure timing signal generation section 814 generates a multiple exposure timing signal lshift_0 by delaying the line synchronization signal lsync_x by a setting value set in the multiple timing setting signal lshift_start. When, for example, the multiple timing setting signal lshift_start is set to 1 (lshift_start=1), the multiple exposure timing signal lshift_0 becomes a signal obtained by delaying the line synchronization signal lsync_x by one cycle of the clock signal clk. The multiple exposure timing signal generation section 814 generates a multiple exposure timing signal lshift_0 in accordance with the rotation speed of the photoconductor drum 102. In other words, the multiple timing setting signal lshift_start is set in accordance with the delay time Tdelay obtained from the above-described expression (1).

Figure 12:
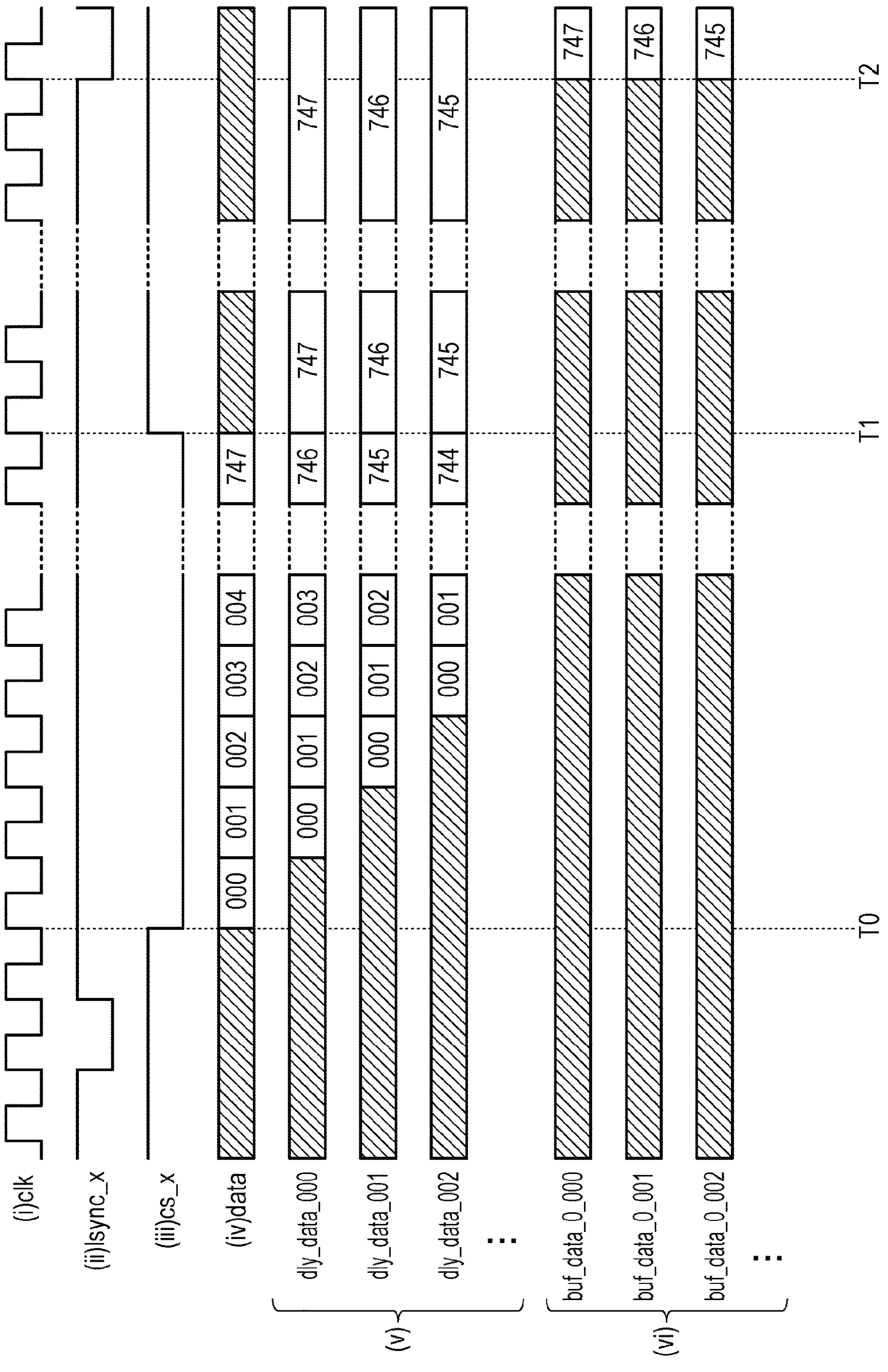
FIG. 12 is a chart showing the waveforms of signals and shift of image data.

FIG. 12 is a timing chart showing the operation of the image data storage section 804 in the longitudinal direction of the light emitting device 401. In FIG. 12, (i) shows the waveform of the clock signal clk, (ii) shows the waveform of the line synchronization signal lsync_x, (iii) shows the waveform of the chip select signal cs_x, and (iv) shows the image data signal data with 000 to 747. Here, for example, "000" represents image data corresponding to the lower electrode 410-1, and "747" represents image data corresponding to the lower electrode 410-748. The diagonally shaded area for the image data signal data represents invalid data as image data. (v) shows pieces of image data dly_data_000 and the like that are outputs of the flip-flop circuits 811, and (vi) shows pieces of image data buf_data_0_000 and the like that are outputs of the flip-flop circuits 812.

During the period from time T0 to time T1 during which the chip select signal cs_x is 0 (cs_x=0 (low level)), image data shifts as follows via the flip-flop circuits 811 connected in series. Time T1 is time at which cs_x=1 is captured at the leading edge of the clock signal clk. In other words, image data sequentially shifts like data→dly_data_ 000→dly_data_001→ . . . →dly_data_747. During the period in which the chip select signal cs_x is low level (cs_x=0), it is assumed that clock signals clk equal in number to the lower electrodes in the longitudinal direction of the light emitting device 401, that is, 748 clock signals clk, are input. With this configuration, one-line image data is held in dly_data_000 to dly_data_747.

From time Tl, the chip select signal cs_x is 1 (cs_x=1 (high level)), so no shift operation is performed, and image data at time T1 is held. For example, the image data dly_data_000 held in the first flip-flop circuit 811 from time T1 is 747. When the line synchronization signal lsync_x becomes 0 (lsync_x=0 (low level)) at time T2, one-line image data is concurrently output to the pulse signal generation sections 805 as buf_data_0_000 to buf_data_0_747. Time T2 is time at which lsync_x=0 is captured at the leading edge of the clock signal clk. In other words, the image data dly_data_000 and the like held in the flip-flop circuits 811 are output to the pulse signal generation sections 805 as image data buf_data_0_000 and the like via the flip-flop circuits 812.

Figure 13:
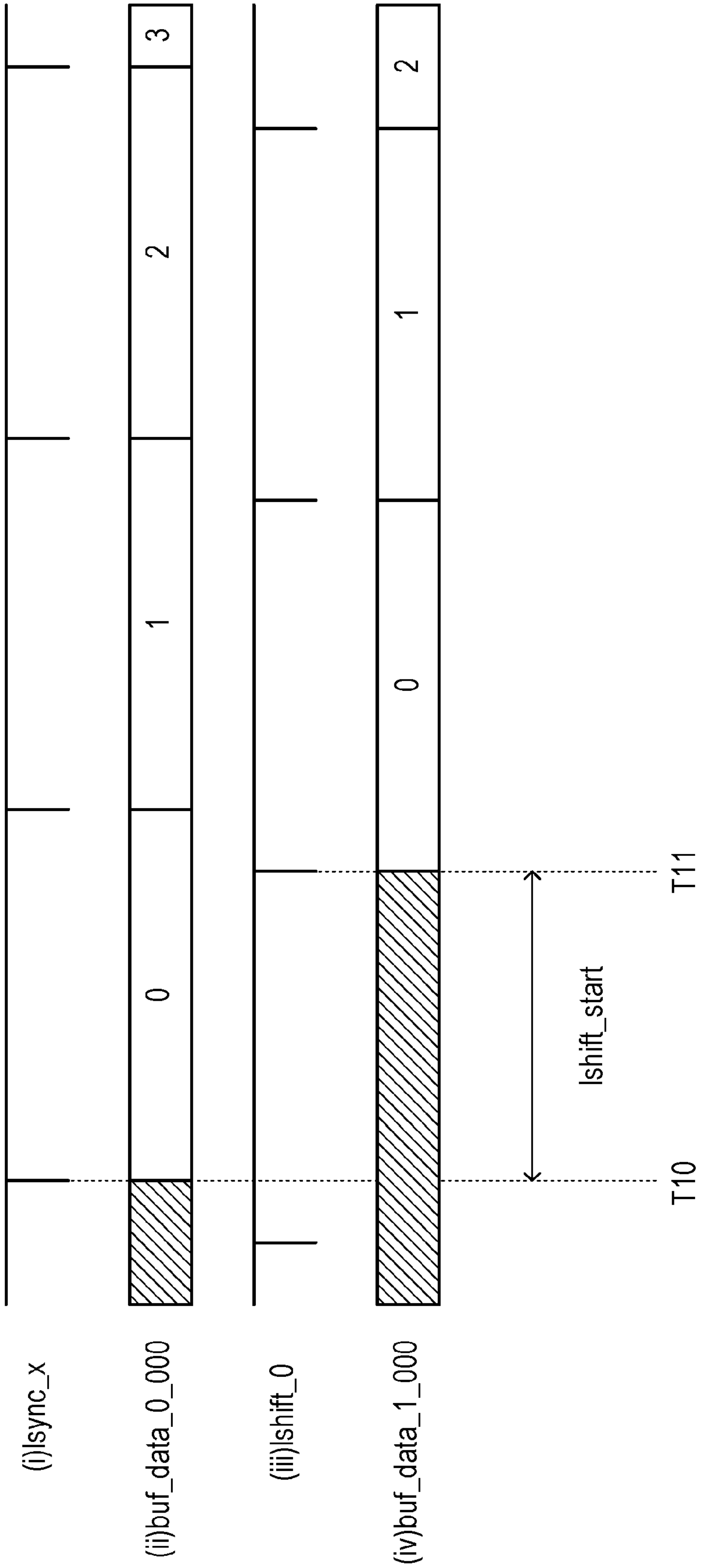
FIG. 13 is a chart showing the waveforms of signals and image data for performing multiple exposure according to the embodiment.

Next, FIG. 13 is a timing chart showing the operation of the image data storage section 804 in the Y direction. In FIG. 13, (i) shows the waveform of the line synchronization signal lsync_x, and (ii) shows image data buf_data_0_000 or the like that is the output of the flip-flop circuit 812. (iii) shows the waveform of the multiple exposure timing signal lshift_0, and (iv) shows image data buf_data_1_000 or the like that is the output of the flip-flop circuit 813. FIG. 13 representatively illustrates image data buf_data_0_000 that is the output of the flip-flop circuit 812 and image data buf_data_1_000 that is the output of the flip-flop circuit 813 at the leftmost end in FIG. 11B. This also applies to all the pieces of image data buf_data_0_001 to buf_data_0_747, and buf_data_1_001 to buf_data_1_747.

As described with reference to FIG. 12, image data dly_data_000 is input to the flip-flop circuit 812 at time T10 in FIG. 13, which is the timing at which the line synchronization signal lsync_x becomes 0 at time T2 in FIG. 12. Then, the value of the image data dly_data_000 is output from the flip-flop circuit 812 as the image data buf_data_0_000. At time T11, the multiple exposure timing signal lshift_0 is input to the flip-flop circuit 813 as low level (lshift_0=0). Then, the value of the image data buf_data_0_000 output from the flip-flop circuit 812 is output from the flip-flop circuit 813 to the pulse signal generation section 805 as image data buf_data_1_000. In this way, data output to the pulse signal generation section 805 as buf_data_0_000 in a state where lsync_x=0 is output to the pulse signal generation section 805 again as buf_data_1_000 at the timing at which the next lshift_0=0. Here, time T11 at which the multiple exposure timing signal lshift_0 becomes low level is timing delayed by the multiple timing setting signal lshift_start from time T10 at which the line synchronization signal lsync_x becomes low level. Image data buf_data_0_000 is output to the pulse signal generation section 805 corresponding to the lower electrode used in preceding exposure in the Y direction on the photoconductor drum 102. Image data buf_data_1_000 is output to the pulse signal generation section 805 corresponding to the lower electrode used in subsequent exposure in the Y direction on the photoconductor drum 102. Thus, multiple exposure is achieved.

In the present embodiment, the configuration in which multiple exposure is performed by using the two lower electrode 410-*n* and lower electrode 420-*n* arranged in the Y direction has been described as an example; however, the number of lower electrodes used for multiple exposure is not limited to two. When the number of lower electrodes used for multiple exposure is increased (when rows of m=3 or more lower electrodes are used for multiple exposure), the flip-flop circuits 812, 813 (748) shown in FIG. 11B can be increased to m rows (m×748). Thus, pieces of image data corresponding to m-row (m×748) lower electrodes are able to be held. By increasing the pulse signal generation sections 805 connected to the m-row flip-flop circuits to m rows (m×748), the light emission timing of each of the m-row (m×748) lower electrodes is able to be controlled, with the result that m-row multiple exposure is possible.

In the present embodiment, the flip-flop circuit has been described as an example of a means of holding image data of each of the lower electrodes. With this configuration, the flip-flop circuits are disposed together with the lower electrodes 410-1 to 410-748, with the result that a further simple circuit with less wiring area is configured. On the other hand, when a flip-flop circuit is not used, the following configuration may be adopted. As long as a memory circuit (for example, a RAM or the like) corresponding to a lower electrode and a control unit that controls the timing to read from and the timing to write to the memory circuit are provided, a flip-flop circuit is not necessarily used.

When the number of lower electrodes used for multiple exposure is increased and the number of lower electrode arrays used for multiple exposure is selectable, further dynamic light amount control is possible. In the case of, for example, the configuration in which the number of rows m of lower electrode arrays is m=10 and lower electrodes are arranged in the Y direction, lower electrode arrays used for multiple exposure can be selected from among two rows to 10 rows according to the image forming speed of the image forming apparatus. Thus, light output can be changed in nine levels. Therefore, a control range of a drive current of each of the lower electrodes can be reduced, and the lower electrodes can be constantly driven under substantially equal drive current conditions. When, for example, lower electrodes are driven at a low current (that is, a low amount of light), there is a case where the response of the lower electrodes delays and a predetermined amount of light is not obtained. In such a case, it is possible to stably drive lower electrodes by using multiple exposure according to the present embodiment. In this way, to select which rows of a plurality of rows of lower electrodes are used, the configuration in which reset terminals are added to the flip-flop circuits 812, 813 and the like and output of image data is selectively stopped may be adopted. Other than such a method, a means of stopping the output of a pulse signal may be added to the pulse signal generation section 805.

Analog Section

Figure 14A:
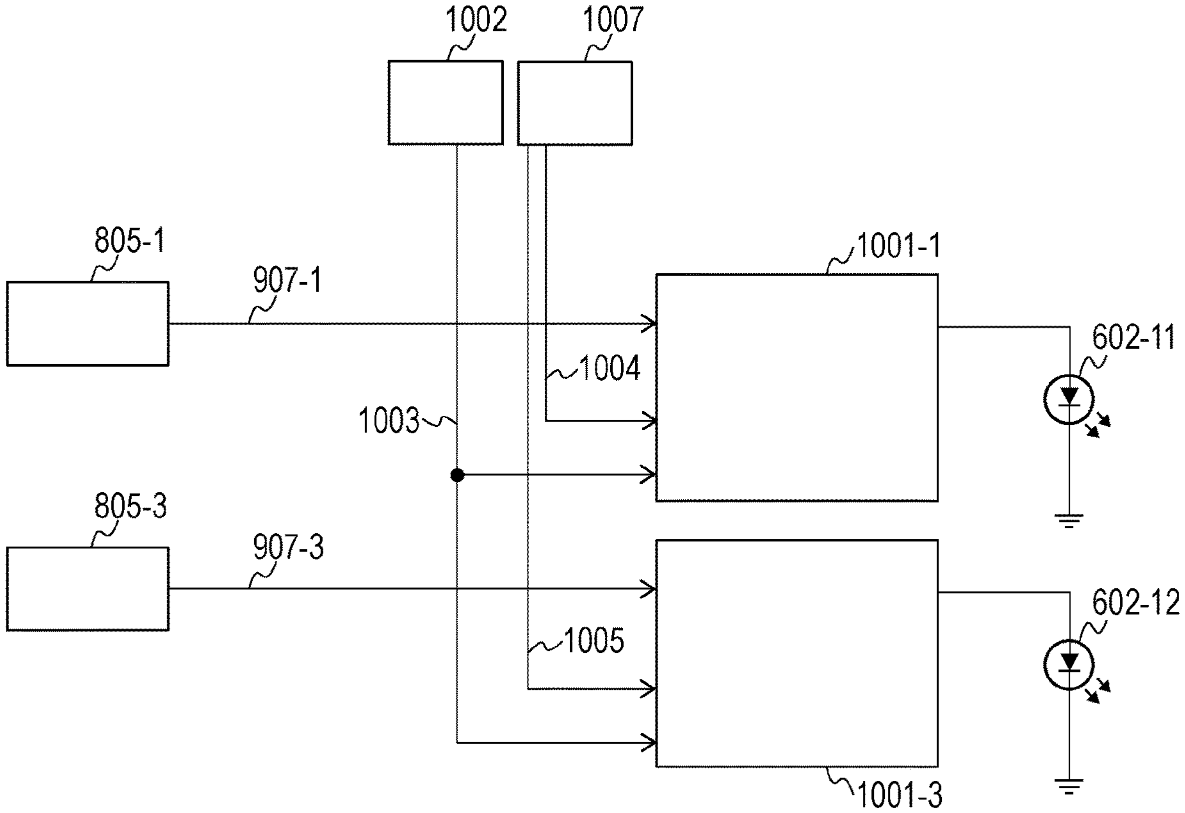
FIG. 14A is a block diagram of an analog section according to the embodiment.

FIG. 14A shows a block diagram in the analog section 806. In the present embodiment, for the sake of simple description, the description will be made by showing drive portions 1001-1, 1001-3 that respectively drive the two lower electrodes 410-1, 410-2 in the lower electrode array 410-1 to 410-748. However, it is assumed that similar drive portions 1001-1 to 1001-748 are formed in correspondence with the lower electrodes included in the lower electrode array 410-1 to 410-748 and are also formed in correspondence with another lower electrode array. The pulse signal generation sections 805-1, 805-3 respectively generate pulse signals for controlling the light emission (ON) timings of the lower electrodes 410-1, 410-2. The pulse signal generation sections 805-1, 805-3 respectively input the pulse signals to the drive portions 1001-1, 1001-3 via pulse signal lines 907-1, 907-3.

A digital-analog converter (hereinafter, referred to as DAC) 1002 supplies an analog voltage that determines a drive current to the drive portions 1001-1, 1001-3 via a signal line 1003 in accordance with data set in the register section 802. A drive portion select section 1007 supplies a drive portion select signal for selecting one of the drive portions 1001-1, 1001-3 to the drive portions 1001-1, 1001-3 via signal lines 1004, 1005 in accordance with data set in the register section 802. The drive portion select signal is generated such that only the signal connected to the selected drive portion 1001 is high level. When, for example, the drive portion 1001-1 is to be selected, a high-level drive portion select signal is supplied to only the signal line 1004, and a low-level drive portion select signal is supplied to the signal line 1005 or the like, that is, the signal line 1005 and the like respectively connected to the other drive portions 1001-3 and the like. In the present embodiment, a drive portion select signal is positive logic; however, a drive portion select signal may be negative logic.

An analog voltage input via the signal line 1003 is set to the drive portion 1001-1 or the drive portion 1001-3 at the timing at which the drive portion is selected by the drive portion select section 1007 (timing at which the drive portion select signal becomes high level). The CPU 703 sequentially selects the drive portions 1001-1, 1001-3 via the register section 802 and sets a voltage associated with the selected one of the drive portions 1001-1, 1001-3. Thus, the CPU 703 sets the analog voltages of all the drive portions 1001 with the one DAC 1002. The analog voltage that determines a drive current and the pulse signal are input to each of the drive portions 1001-1, 1001-3 through the above-described operation, and the drive current and light emission time of each of the lower electrodes 410-1, 410-2 are independently controlled by a drive circuit that will be described later.

Drive Portion

Figure 14B:
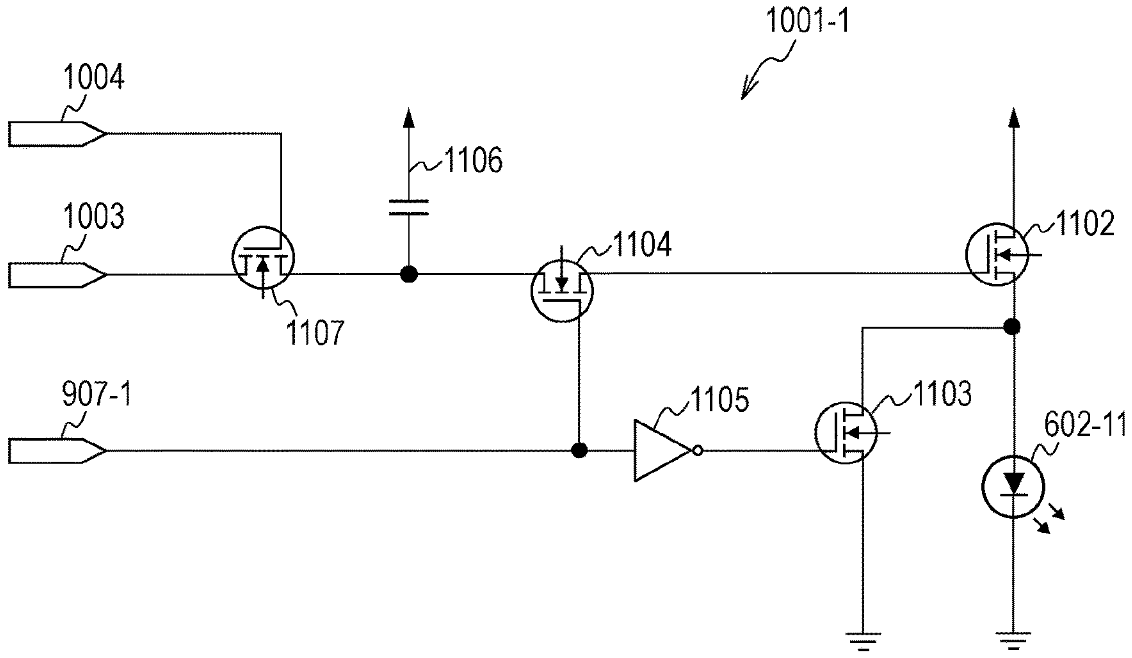
FIG. 14B is a circuit diagram of a drive portion according to the embodiment.

FIG. 14B shows the circuit of the drive portion 1001-1 that drives the lower electrode 410-1. It is assumed that the drive portions 1001 for the other lower electrodes are also driven by similar circuits. A MOS field effect transistor (hereinafter, referred to as MOSFET) 1102 supplies a drive current to the lower electrode 410-1 in response to a gate voltage value and, when the gate voltage is low level, controls a current such that the drive current is shut off (turned off).

The pulse signal line 907-1 is connected to the gate terminal of a MOSFET 1104, and, when the pulse signal is high level, a voltage charged in a capacitor 1106 is transferred to the MOSFET 1102. A drive portion select signal transmitted from the drive portion select section 1007 (transferred by the signal line 1004) is connected to the gate terminal of a MOSFET 1107. The MOSFET 1107 turns on when the received drive portion select signal is high level and charges the capacitor 1106 with the analog voltage output from the DAC 1002 (transferred by the signal line 1003). In the present embodiment, at the timing before image formation, the DAC 1002 sets an analog voltage in the capacitor 1106 and sets the MOSFET 1107 in an off state and continues holding a voltage level during an image formation period.

Through the above operation, the MOSFET 1102 supplies a drive current to the lower electrode 410-1 in accordance with the set analog voltage and the pulse signal. When the input capacitance of the lower electrode 410-1 is large and the turn-off response speed is low, the turn-off speed can be increased by using a MOSFET 1103. A signal logically inverted from the pulse signal by an inverter 1105 is input to the gate terminal of the MOSFET 1103. When the pulse signal is low level, the gate terminal of the MOSFET 1103 becomes high level, and an electric charge in the input capacitance of the lower electrode 410-1 is forcibly discharged.

In the present embodiment, the configuration in which the amount of light of the entire image is controlled by drive current and the amount of light according to image data in each pixel section is controlled by PWM has been described as an example; however, a control method for the amount of light is not limited in the present invention. Both control over the entire image and control in each pixel section may be performed by control based on drive current or may be performed by PWM.

Switching of Direction to Drive Lower Electrodes (Supporting Staggered Arrangement)

As described above, in the present embodiment, the configuration in which the light emitting devices 401 are disposed in a staggered manner (hereinafter, referred to as staggered arrangement) on the drive circuit board 202 is adopted as an example. When the light emitting devices 401 are disposed in a staggered arrangement, good image-forming characteristics are obtained by placing the lower electrodes near the lens center of the rod lens array 203 in the transverse direction. When a low-priced rod lens array is used, the opening of each rod lens has limitations. Therefore, if each of the lower electrodes is too far from the rod lens center, light does not reach the opening of the rod lens, so there can be a case where light is not emitted onto the photoconductor drum 102. For this reason, the configuration in which a lower electrode array is disposed on one side in the transverse direction with respect to the center of the light emitting device 401 and the lower electrode array is disposed close to the rod lens center as much as possible is effective.

In FIG. 4, the center of the rod lens array 203 in the transverse direction is represented by the dashed line and indicated as L_center. The rod lens array 203 and the light emitting devices 401 are mounted such that the center line L_center of the rod lens array 203 in the transverse direction (hereinafter, referred to as center line) and the center of the two light emitting devices 401 disposed in a staggered arrangement coincide with each other. The lower electrodes of each light emitting device 401 are arranged adjacent to a position closer to the center line L_center than the center of the light emitting device 401. Here, in the light emitting device 401-2*n* (one first circuit board), a surface far from the light emitting device 401-2*n*+1 is defined as end surface 311, and a surface closer to the light emitting device 401-2*n*+1 is defined as end surface 310. In a light emitting device 401B (the other first circuit board), a surface far from a light emitting device 401A is defined as end surface 311, and a surface close to the light emitting device 401B is defined as end surface 310. In any one of the light emitting devices 401, the lower electrodes are disposed adjacent to the end surface 310 side.

By disposing the lower electrodes in this way, each of the lower electrodes is disposed such that light enters the opening of the rod lens array 203. In the present embodiment, the lower electrodes in each light emitting device 401 are arranged at a position adjacent to one side with respect to the center of the light emitting device 401 in the transverse direction. In any light emitting device 401, the direction in which the light emitting device 401 is mounted is determined such that the end surface 310 is adjacent to the center line L center side. In other words, in the silicon circuit board 402, a plurality of lower electrodes 410-1 to 410-748 is disposed closer to the center (center line L center) of the rod lens array 203 in the transverse direction. When the light emitting devices 401 are arranged in two rows of staggered arrangement, the light emitting device 401A and the light emitting device 401B are disposed such that the lower electrodes approach the center line L center in a state where the light emitting device 401A and the light emitting device 401B are inverted by 180° therebetween.

In this way, the mounting direction of each light emitting device 401 is determined such that the positions of the lower electrodes are adjacent to one side in each light emitting device 401 and the lower electrodes approach the center line L_center. Thus, good image-forming characteristics can be obtained. On the other hand, by disposing each light emitting device 401 in the different mounting direction as described above, the order in which the lower electrodes are turned on in the Y direction needs to be controlled in accordance with the direction of the light emitting device 401. For example, the lower electrodes closer to the end surface 311 (upper side in the drawing) turn on in first in the light emitting device 401A, the lower electrodes closer to the end surface 310 (upper side in the drawing) turn on in first in the light emitting device 401B. A control method in such a case will be described below.

Circuit with Selectors

Figure 15:
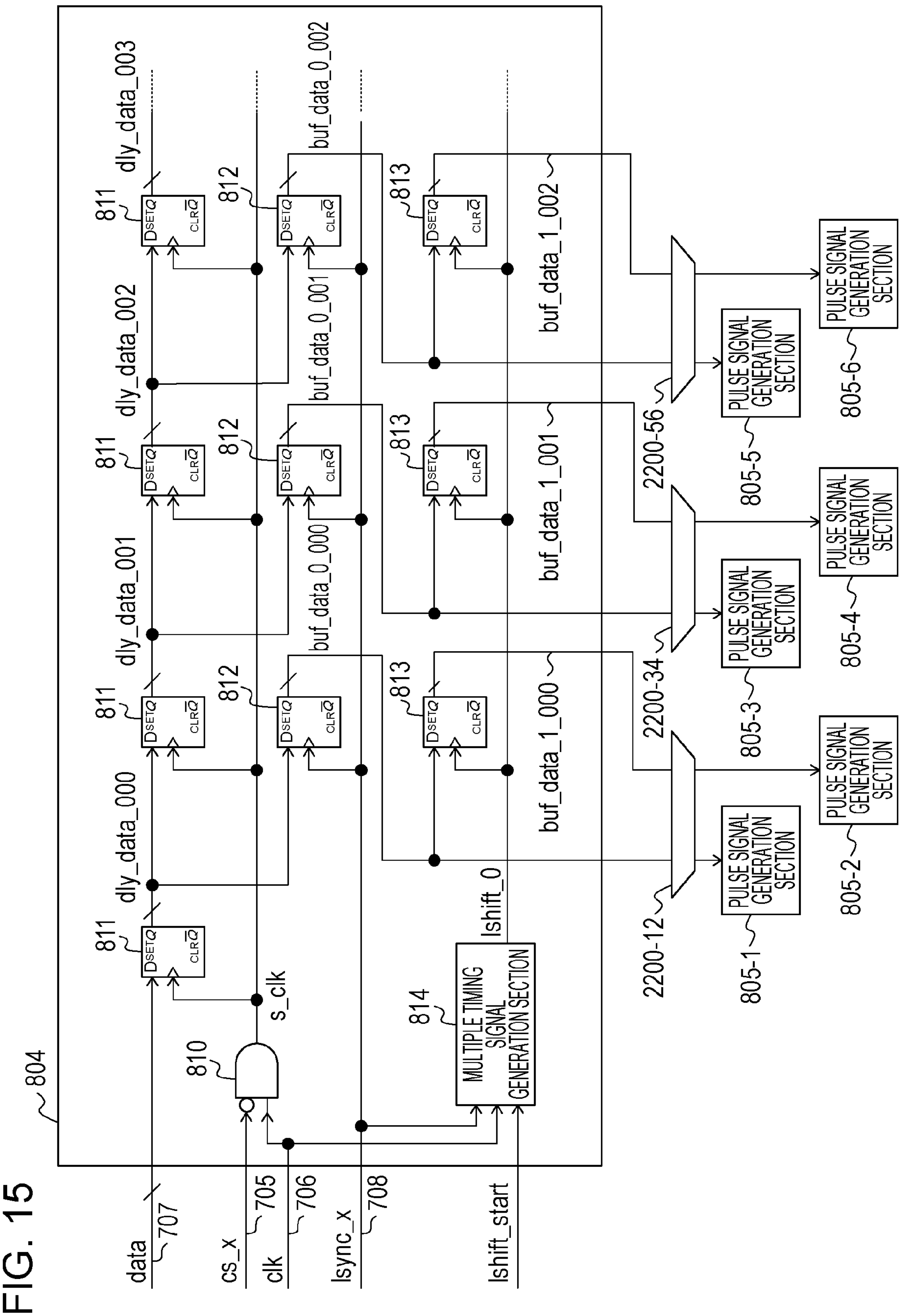
FIG. 15 is a circuit diagram in a light emitting device that switches the order of light emission according to the embodiment.

FIG. 15 is a circuit block diagram inside the light emitting device 401 that switches the order of light emission of the lower electrode array 410-1 to 410-748 in the transverse direction of the drive circuit board 202. The case where two-tow lower electrode array 410-1 to 410-748 and lower electrode array 420-1 to 420-748 are provided in the Y direction, as in the case of FIG. 11B, will be described. In addition to the circuit configuration illustrated in FIG. 11B, the image data storage section 804 includes selectors 2200-12, 2200-34, 2200-56, . . . . The selector 2200-12 switches a combination of connection between the pair of flip-flop circuit 812 and flip-flop circuit 813 and the pair of pulse signal generation section 805-1 and pulse signal generation section 805-2. The selector 2200-34 switches a combination of connection between the pair of flip-flop circuit 812 and flip-flop circuit 813 and the pair of pulse signal generation section 805-3 and pulse signal generation section 805-4. The selector 2200-56 switches a combination of connection between the pair of flip-flop circuit 812 and flip-flop circuit 813 and the pair of pulse signal generation section 805-5 and pulse signal generation section 805-6.

The selectors 2200-12, 2200-34, 2200-56, . . . are collectively referred to as selectors 2200. The selector 2200 is capable of switching a connection relationship with the pulse signal generation sections 805 that are destinations to which the flip-flop circuits 812, 813 respectively transmit image data. In other words, the selector 2200 functions as a select section that selects a combination of connection between the pair of first memory circuit group and second memory circuit group and the pair of first pulse signal generation section group and second pulse signal generation section group.

For example, in one light emitting device 401 in the longitudinal direction of staggered arrangement, the flip-flop circuit 812 connects with the pulse signal generation section 805-1, and the flip-flop circuit 813 connects with the pulse signal generation section 805-2. In the other light emitting device 401 in the longitudinal direction of staggered arrangement, the flip-flop circuit 812 connects with the pulse signal generation section 805-2, and the flip-flop circuit 813 connects with the pulse signal generation section 805-1. Information on connection of the selector 2200 is set in a predetermined register of the register section 802 in accordance with a communication signal from the CPU 703. It is assumed that connection of the selector 2200 is controlled in accordance with information on connection (register value) set in the register section 802.

As described above, with a means of switching the order in which the lower electrodes are turned on, multiple exposure is able to be performed regardless of the direction in which the light emitting device 401 is disposed on the drive circuit board 202. In the present embodiment, usability of staggered arrangement has been described, and it is also usable at the time when the same exposure head is used in a plurality of different image forming apparatuses. The order of turning on is selected in accordance with the rotation direction of the photoconductor drum 102 and the mounting direction of the exposure head. Thus, in an image forming apparatus in which the rotation direction of the photoconductor drum 102 is different as well, the same exposure head can be used.

As described above, in the present embodiment, by arranging the lower electrodes in the Y direction and performing multiple exposure, high light output of the exposure head is possible, with the result that it is possible to increase the speed of the image forming apparatus and support a photoconductor material that needs a further amount of light. By configuring the lower electrode arrays and the circuit portions 406 on the silicon circuit board, it is possible to provide finer output resolution and higher performance of control resulting from allowing incorporation of a large scale logic circuit of the light emitting device.

The silicon circuit board 402 includes a means of generating image data for multiple exposure. Thus, it is possible to generate necessary image data without increasing the wiring lines (wire bonding) of the interface of each light emitting device 401. It is possible to optimize the area of wiring by optimally disposing the memory circuits (flip-flop circuits). Furthermore, it is possible to control the light emission timing according to the print speed, resolution, and clearance between the lower electrodes of the light emitting device 401 in the image forming apparatus. Thus, an exposure region subjected to multiple exposure on the photoconductor drum 102 can be sharpened.

Second Embodiment

Next, a second embodiment will be described. In the first embodiment, the light emitting device that has a structure in which the lower electrodes are arranged in a two-dimensional array has been illustrated, while in the second embodiment, a light emitting device that has a structure in which lower electrodes are arranged in a one-dimensional array (arranged in an array) will be illustrated. In the present embodiment, the description of items that overlap those in the description of the first embodiment is omitted.

Figure 16:
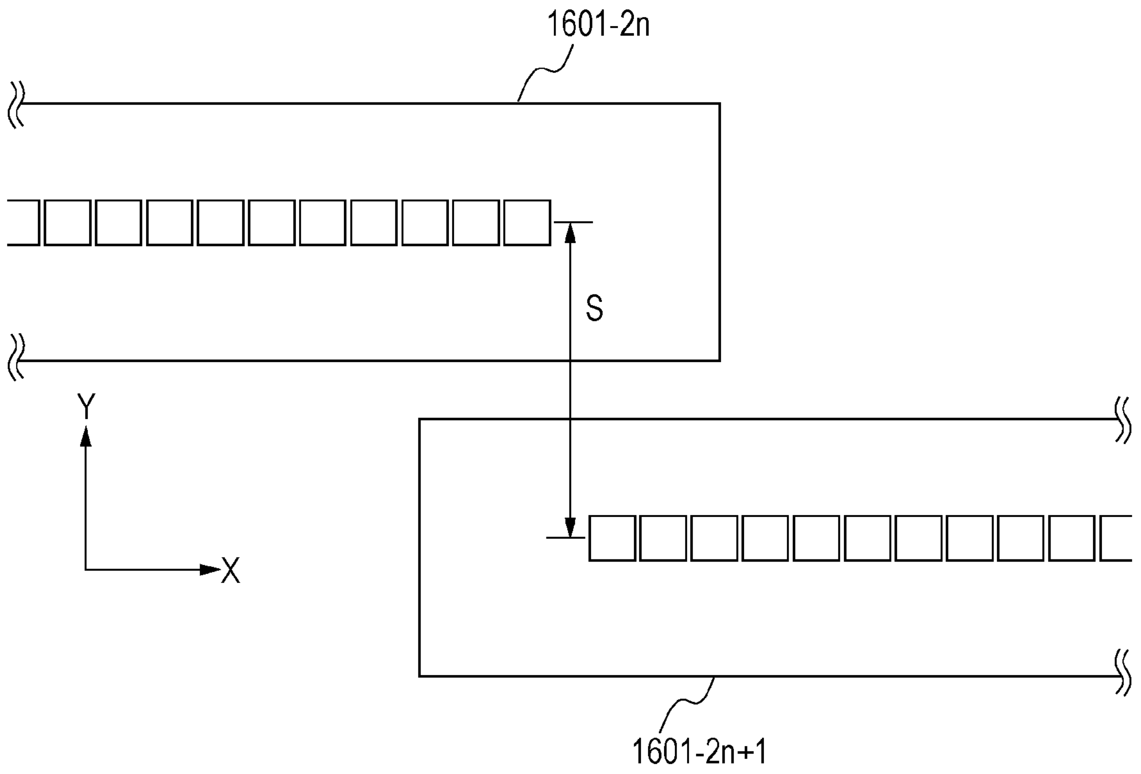
FIG. 16 is a diagram showing a layout relationship on a printed circuit board between a plurality of light emitting devices according to a second embodiment.
Figure 17:
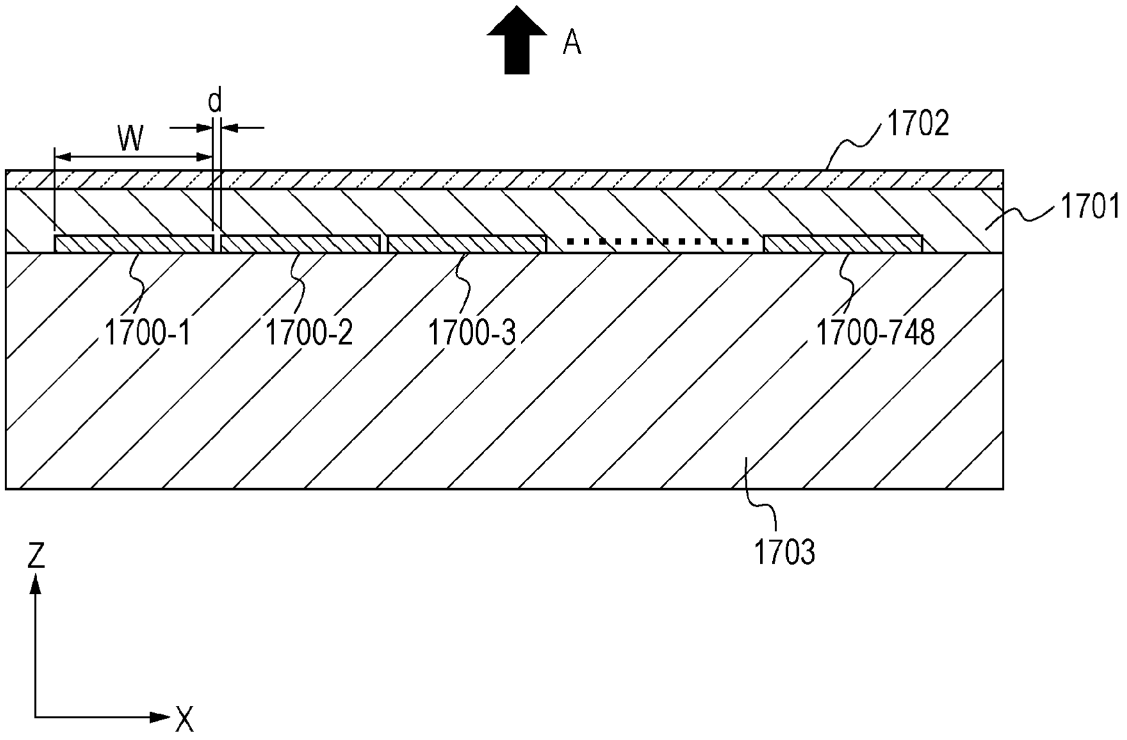
FIG. 17 is a schematic sectional view of the light emitting device according to the second embodiment.
Figure 18:
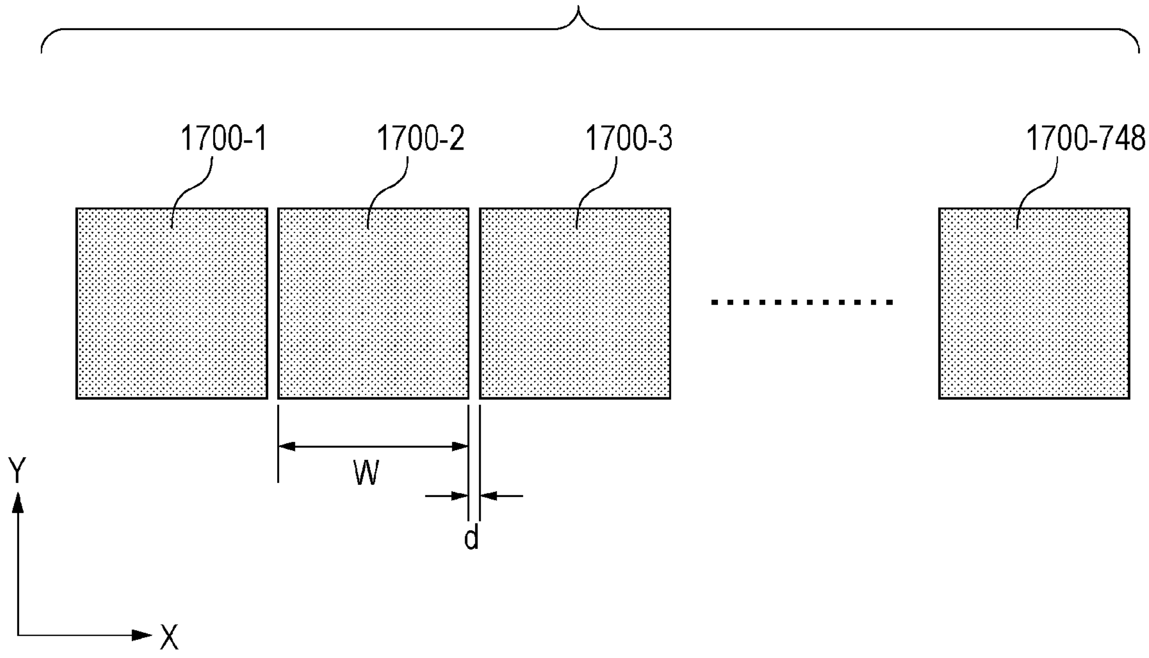
FIG. 18 is a diagram showing an array of lower electrodes according to the second embodiment.

The present embodiment will be described with reference to FIGS. 16 to 18. FIG. 16 is a diagram showing a layout relationship on a printed circuit board between a plurality of light emitting devices. FIG. 17 is a schematic sectional view of the light emitting device. FIG. 18 is a diagram showing an array of lower electrodes.

FIG. 16 is a diagram showing a state of a boundary part between the chips of light emitting devices 1601 disposed in two rows in the longitudinal direction. The light emitting devices 1601 correspond to the light emitting devices 401 in the first embodiment.

The horizontal direction corresponds to the longitudinal direction of the light emitting devices 401 in FIG. 3A. As in the case of FIG. 4, FIG. 16 shows the boundary part between the chips of the light emitting devices 1601 (a part where the ends of the chips overlap in the longitudinal direction (overlap part)). At the boundary part between the light emitting device 1601-2*n* and the light emitting device 1601-2*n*+1 as well, the pitch of the lower electrodes (the distance between the centers of the two light emitting elements) at the ends between different light emitting devices is substantially 21.16 μm that is the pitch of the resolution of 1200 dpi.

The light emitting device 1601 will be further described in detail with reference to FIGS. 17 and 18. An X direction in FIGS. 17 and 18 represents the longitudinal direction of the exposure head. A Z direction is a direction in which layers of a layer structure (described later) are laminated.

FIG. 17 is an enlarged relevant part diagram of a schematic sectional view taken along the line VII, XVII-VII, XVII in FIG. 6. FIG. 18 is a schematic diagram of lower electrodes 1700-1 to 1700-748 (described later) when viewed in the Z direction. As shown in FIG. 17, the light emitting device 1601 includes a silicon circuit board 1703, lower electrodes 1700-1 to 1700-748, a light emitting layer 1701, and an upper electrode 1702.

The silicon circuit board 1703 is a drive circuit board in which a drive circuit that includes drive portions respectively corresponding to the lower electrodes 1700-1 to 1700-748 (described later) is formed in a manufacturing process. The drive circuit has a structure in which the drive circuit described in the first embodiment is configured to support a one-dimensional array light emitting devices, and there is no significant difference in the relevant part, so the description is omitted.

As shown in FIG. 17, the lower electrodes 1700-1 to 1700-748 (negative electrodes) are a plurality of electrodes formed in a layer (second electrode layer) on the silicon circuit board 1703. The lower electrodes 1700-1 to 1700-748 are respectively formed on the plurality of drive portions incorporated in the silicon circuit board 1703 by using an Si integrated circuit processing technology together with the manufacturing process for manufacturing the silicon circuit board 1703. As in the case of the first embodiment, the lower electrodes 1700-1 to 1700-748 are preferably made of a metal with a high reflectance to the emission wavelength of the light emitting layer 1701 (described later). Therefore, the lower electrodes 1700-1 to 1700-748 preferably contain silver (Ag), aluminum (Al), an alloy of them, a silver-magnesium alloy, or the like.

As shown in FIGS. 17 and 18, the lower electrodes 1700-1 to 1700-748 are electrodes provided in correspondence with pixels in the X direction. In other words, each of the lower electrodes 1700-1 to 1700-748 is an electrode provided to form one pixel.

The width W of the lower electrodes 1700-1 to 1700-748 in the X direction in the present embodiment corresponds to the width of one pixel. A clearance d is a distance between the lower electrodes in the X direction. Since the lower electrodes 1700-1 to 1700-748 are formed with the clearance the distance d on the silicon circuit board 1703, the plurality of drive portions formed in the silicon circuit board 1703 are capable of respectively individually controlling the voltages of the lower electrodes 1700-1 to 1700-748. An organic material of the light emitting layer 1701 is filled in the clearance d, and the lower electrodes are partitioned by the organic material.

In the light emitting device 1601 according to the present embodiment, the width W of each of the lower electrodes 1700-1 to 1700-748 is set to a nominal dimension of 20.90 m, and the clearance d is set to a nominal dimension of 0.26 μm. In other words, the light emitting device 1601 according to the present embodiment includes one lower electrode 1700 for every 21.16 μm in the X direction. Since 21.16 μm is the size of one pixel in 1200 dpi, the width of the lower electrode 1700 in the X direction of each lower electrode is a size equivalent to one pixel corresponding to the output resolution of the image forming apparatus according to the present embodiment. A process rule in the light emitting device 1601 according to the present embodiment is about 0.2 μm and is high in precision, and it is possible to form a width of dl with a resolution of 0.26 μm.

The width of the lower electrodes 1700-1 to 1700-748 in the Y direction that is the rotation direction of the photoconductor drum is W. In other words, the lower electrodes 1700-1 to 1700-748 according to the present embodiment each have a shape of a square having side 20.90 μm, and the area of the lower electrode 1700 is 436.81 $\mu m^2$. This occupies about 97.6% of the area of one pixel, that is, 447.7456 $\mu m^2$. An organic luminescent material is less in the amount of light than an LED. In contrast, when the lower electrodes in a square shape are formed on the silicon circuit board 1703 with a reduced distance between the adjacent lower electrodes as described above, it is possible to ensure the light emitting area for obtaining the amount of light to such an extent that the potential of the photoconductor drum can be changed. It is desirable to ensure the lower electrode area that is 90% or more of the occupied area of one pixel. Therefore, it is desirable to form the width of one side of the lower electrode 1700 by about 20.07 μm or greater for the image forming apparatus with an output resolution of 1200 dpi, and it is desirable to form the width of one side of the lower electrode 1700 by about 10.04 μm or greater for the image forming apparatus with an output resolution of 2400 dpi.

On the other hand, an upper limit of the occupied area of the lower electrode 1700 should be set in accordance with the transmittance of the rod lens array and the upper electrode (described later) and, in the present embodiment, the upper limit is set to 110% of the occupied area of one pixel. When the occupied area of the lower electrode 1700 is designed to be greater than 110% of the occupied area of one pixel, the size of a pixel formed at the time of exposing a photoconductor drum with high sensitivity to light may significantly exceed the resolution, so the upper limit value of the occupied area of the lower electrode 1700 is set to 110%. Therefore, it is desirable to form the width of one side of the lower electrode 1700 by about 22.19 μm or less for the image forming apparatus with an output resolution of 1200 dpi, and it is desirable to form the width of one side of the lower electrode 1700 by about 11.10 μm or less for the image forming apparatus with an output resolution of 2400 dpi. In other words, the range of the occupied area of the lower electrode for the occupied area of one pixel is preferably higher than or equal to 90% and lower than or equal to 110%.

The shape of the lower electrode is not limited to a square shape and may be a shape, such as a polygonal shape more than a quadrilateral shape, a circular shape, and an elliptical shape, as long as light with a spot size corresponding to the output resolution of the image forming apparatus is emitted and the quality of an output image satisfies the design specifications of the image forming apparatus by that light.

Next, the light emitting layer 1701 will be described. The light emitting layer 1701 is formed so as to be laminated on the silicon circuit board 1703 on which the lower electrodes 1700-1 to 1700-748 are formed. In other words, in the area where the lower electrodes 1700-1 to 1700-748 are formed, the light emitting layer 1701 is formed on the lower electrodes 1700-1 to 1700-748 and formed on the silicon circuit board 1703 in the area where the lower electrodes 1700-1 to 1700-748 are not formed. In the present embodiment, in the light emitting device 1601, the light emitting layer 1701 is formed so as to bridge over all the lower electrodes 1700-1 to 1700-748; however, the embodiment is not limited thereto. For example, the light emitting layer 1701 may be formed so as to be laminated separately on each of the lower electrodes as in the case of the lower electrodes 1700-1 to 1700-748, or the lower electrodes 1700-1 to 1700-748 may be divided into a plurality of groups and one light emitting layer may be laminated on the lower electrodes that belong to the same group for each of the divided groups.

For example, an organic material may be used for the light emitting layer 1701. The light emitting layer 1701 that is an organic EL film is a lamination structure that includes functional layers, such as an electron transport layer, a hole transport layer, an electron injection layer, a hole injection layer, an electron block layer, and a hole block layer. Other than an organic material, an inorganic material may be used for the light emitting layer 1701. The upper electrode 1702 (positive electrode) is laminated on the light emitting layer 1701 (as a first electrode layer). The upper electrode 1702 is an electrode capable of transmitting light with the emission wavelength of the light emitting layer 1701. Therefore, the upper electrode 1702 according to the present embodiment adopts a material containing indium tin oxide (ITO) as a transparent electrode. An electrode made of indium tin oxide has a transmittance of 80% or higher to light in a visible light range, so the electrode is suitable as the electrode of an organic EL device.

The upper electrode 1702 is formed on the side across at least the light emitting layer 1701 from the lower electrodes 1700-1 to 1700-748. In other words, the light emitting layer 1701 is disposed in the Z direction between the upper electrode 1702 and the lower electrodes 1700-1 to 1700-748, and, when the lower electrodes 1700-1 to 1700-748 are projected onto the upper electrode 1702 in the Z direction, the region in which the lower electrodes 1700-1 to 1700-748 are formed fits into the region in which the upper electrode 1702 is formed. A transparent electrode does not need to be laminated all over the light emitting layer 1701; however, in order to emit light produced in the light emitting layer 1701 to be efficiently emitted to outside the light emitting device 1601, the occupied area of the upper electrode 1702 to the occupied area of one pixel is preferably higher than or equal to 100% and more preferably higher than or equal to 120%. The upper limit value of the occupied area of the upper electrode 1702 is optionally designed by the areas of the silicon circuit board 1703 and the light emitting layer 1701. Wiring lines may be disposed in an area other than the area through which light is transmitted in the upper electrode 1702.

The upper electrode 1702 according to the present embodiment is a positive electrode provided in common for the lower electrodes 1700-1 to 1700-748; however, the upper electrode 1702 may be provided individually for each of the lower electrodes 1700-1 to 1700-748 or one upper electrode may be provided for each set of lower electrodes.

The drive circuit controls the potential of each of the lower electrodes 1700-1 to 1700-748 in accordance with image data in order to generate a potential difference between the upper electrode 1702 and selected lower electrodes of the lower electrodes 1700-1 to 1700-748.

The upper electrode 1702 is formed on the side across at least the light emitting layer 1701 from the lower electrodes 1700-1 to 1700-748. In other words, the light emitting layer 1701 is disposed in the Z direction between the upper electrode 1702 and the lower electrodes 1700-1 to 1700-748, and, when the lower electrodes 1700-1 to 1700-748 are projected onto the upper electrode 1702 in the Z direction, the region in which the lower electrodes 1700-1 to 1700-748 are formed fits into the region in which the upper electrode 1702 is formed. A transparent electrode does not need to be laminated all over the light emitting layer 1701; however, in order to emit light produced in the light emitting layer 1701 to be efficiently emitted to outside the light emitting device 1601, the occupied area of the upper electrode 1702 to the occupied area of one pixel is preferably higher than or equal to 100% and more preferably higher than or equal to 120%.

The upper limit value of the occupied area of the upper electrode 1702 is optionally designed by the areas of the silicon circuit board 1703 and the light emitting layer 1701. Wiring lines may be disposed in an area other than the area through which light is transmitted in the upper electrode 1702.

The upper electrode 1702 according to the present embodiment is a positive electrode provided in common for the lower electrodes 1700-1 to 1700-748; however, the upper electrode 1702 may be provided individually for each of the lower electrodes 1700-1 to 1700-748 or one upper electrode may be provided for each set of lower electrodes.

The drive circuit controls the potential of each of the lower electrodes 1700-1 to 1700-748 in accordance with image data in order to generate a potential difference between the upper electrode 1702 and selected lower electrodes of the lower electrodes 1700-1 to 1700-748.

When a transparent electrode made of indium tin oxide or the like is used as the upper electrode 1702, an aperture ratio representing the light transmission ratio of the electrode can be made substantially equivalent to the transmittance of the upper electrode 1702. In other words, since there is substantially no area, other than the upper electrode 1702, that attenuates light or that blocks light, light produced from the light emitting layer 1701 becomes emission light without being attenuated or blocked as much as possible.

As described above, when the lower electrodes 1700-1 to 1700-748 are formed by high-precision Si integrated circuit processing technology, the lower electrodes 1700-1 to 1700-748 can be disposed in high density. Therefore, almost all the area of light emitting portions (here, the sum of the area of the lower electrodes 1700-1 to 1700-748 and the area of the region between the mutually adjacent lower electrodes) can be allocated to the lower electrodes 1700-1 to 1700-748. In other words, the exposure head has a high efficiency of use of the light emission region per unit area.

When a luminescent material susceptible to moisture, such as an organic EL layer and an inorganic EL layer, is used for the light emitting layer 1701, it is desirable to seal against entry of moisture into the light emitting portions. As a sealing method, for example, a thin-film alone or a laminated sealing film made of a silicon oxide, a silicon nitride, and an aluminum oxide, is formed. A method excellent in performance of coating a structure, such as a step, is preferable as a method of forming a sealing film, and, for example, an atomic layer deposition method (ALD method) or the like may be used. The materials, configurations, formation methods, and the like of a sealing film are one examples, and the embodiment is not limited to the above-described examples. Suitable ones may be selected as needed.

According to the present embodiment, it is possible to suggest an exposure head capable of being driven at high speed with higher light output.

Embodiments of the present invention are not limited to the above-described embodiments. Various changes or modifications are applicable without departing from the spirit and scope of the present invention. Therefore, the following claims are attached to show the scope of the present invention.

It is possible to provide an image forming apparatus that exposes a photoconductor drum to light by using a top emission light emitting device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
- a photoconductor configured to rotate about a rotational axis extending in a rotational axis direction; and
- a plurality of light emitting chips, each light emitting chip of the plurality of light emitting chips including
  - a silicon substrate,
  - a first electrode layer configured to transmit light,
  - a second electrode layer disposed between the first electrode layer and the silicon substrate in a vertical direction vertical to a surface of the silicon substrate and including a plurality of electrodes,
  - a light emitting layer disposed between the first electrode layer and the second electrode layer in the vertical direction, and
  - a drive circuit configured to control light emission of the light emitting layer, the drive circuit being provided in the silicon substrate,
- wherein the drive circuit at least partially overlaps with the first electrode layer and the second electrode layer when viewed in the vertical direction,
- wherein the plurality of electrodes includes at least a first electrode group that forms a first electrode array arranged in the rotational axis direction,
- wherein the light emitting chip includes a first edge and a second edge opposite to the first edge in a transverse direction perpendicular to the rotational axis direction and the vertical direction, each of the first edge and the second edge extending in the rotational axis direction,
- wherein a first distance in the transverse direction between the first edge and the first electrode array is shorter than a second distance in the transverse direction between the second edge and the first electrode array,
- wherein the plurality of electrodes further includes a second electrode group that forms a second electrode array arranged in the rotational axis direction at a position different from the first electrode array in the transverse direction, and
- wherein the drive circuit further includes a selector configured to switch an order of light emission of the first electrode array and the second electrode array.

2. The image forming apparatus according to claim 1,
- wherein the plurality of electrodes is arranged in a two-dimensional array in the direction along the rotational axis and in a direction along a rotational direction of the photoconductor, and
- wherein one pixel corresponding to an output resolution of the image forming apparatus is formed of a region of the light emitting layer that emits light by applying a voltage to at least one electrode of the plurality of electrodes arranged at different positions in the direction along the rotational axis.

3. The image forming apparatus according to claim 1, wherein the first electrode layer is formed in common to all electrodes of the plurality of electrodes.

4. The image forming apparatus according to claim 1, wherein at least one electrode of the plurality of electrodes included in the second electrode layer has a square shape.

5. The image forming apparatus according to claim 1, wherein the light emitting layer is organic EL.

6. The image forming apparatus according to claim 1, wherein the first electrode layer is formed in common to at least some electrodes of the plurality of electrodes.

7. The image forming apparatus according to claim 1, wherein the drive circuit which is provided in the silicon substrate includes a data storage portion having a plurality of memories provided correspondingly to the plurality of electrodes and configured to store respective data based on the image data, and a wiring configured to connect adjacent memories of the plurality memories, and wherein each memory of the plurality of memories is arranged to correspond to an electrode of the plurality of electrodes.

8. The image forming apparatus according to claim 1, wherein the drive circuit which is provided in the silicon substrate includes a data storage portion having a plurality of memories provided correspondingly to the plurality of electrodes and configured to store respective data based on the image data, and a wiring configured to connect adjacent memories of the plurality memories, and wherein the plurality of memories sequentially transmit the data among adjacent memories via the wiring.

9. The image forming apparatus according to claim 1, wherein the drive circuit which is provided in the silicon substrate includes a data storage portion having a plurality of memories provided correspondingly to the plurality of electrodes and configured to store respective data based on the image data, and a wiring configured to connect adjacent memories of the plurality memories, and wherein the plurality of memories is flip-flop circuits.

10. The image forming apparatus according to claim 1, wherein the drive circuit includes a digital-analog converter configured to determine power to be supplied to the plurality of electrodes based on an input setting signal.

11. The image forming apparatus according to claim 1, wherein the plurality of light emitting chips are arranged in a staggered manner along a line extending in the rotational axis direction.

12. The image forming apparatus according to claim 11, wherein the plurality of light emitting chips includes a first chip and a second chip, wherein, in the transverse direction, the first edges of the first chip and the second are disposed between the second edge of the first chip and the second edge of the second chip, and wherein, in each of the first chip and the second chip, the first distance is shorter than the second distance.

13. The image forming apparatus according to claim 12, wherein the first chip and the second chip are arranged to overlap partially with each other when viewed in the transverse direction.

14. The image forming apparatus according to claim 1, wherein, in the transverse direction, a third distance between the first edge and the second electrode array is shorter than a fourth distance between the second edge and the second electrode array.

15. An exposure head comprising:

a drive circuit board, a plurality of light emitting chips provided on the drive circuit board, each of the plurality of light emitting chips including:

a silicon substrate, a first electrode layer configured to transmit light, a second electrode layer formed disposed between the first electrode layer and the silicon substrate in a vertical direction vertical to a surface of the silicon substrate and including a plurality of electrodes, a light emitting layer formed in a layer disposed between the first electrode layer and the second electrode layer in the vertical direction, and a drive circuit configured control light emission of the light emitting layer, the drive circuit being provided in the silicon substrate, wherein the drive circuit at least partially overlaps with the portion of the first electrode layer and the second electrode layer when viewed in the vertical direction, wherein the light emitting chip includes a first edge and a second edge opposite to the first edge in a transverse direction perpendicular to the first direction and the vertical direction, each of the first edge and the second edge extending in the first direction, wherein a first distance in the transverse direction between the first edge and the first electrode array is shorter than a second distance in the transverse direction between the second edge and the first electrode array, wherein the plurality of electrodes further includes a second electrode group that forms a second electrode array arranged in the rotational axis direction at a position different from the first electrode array in the transverse direction, and wherein the drive circuit further includes a selector configured to switch an order of light emission of the first electrode array and the second electrode array.

16. The exposure head according to claim 15, wherein the plurality of light emitting chips are arranged in a staggered manner along a line extending in the first direction.

17. The exposure head according to claim 16, wherein the plurality of light emitting chips includes a first chip and a second chip, wherein, in the transverse direction, the first edges of the first chip and the second are disposed between the second edge of the first chip and the second edge of the second chip, and wherein, in each of the first chip and the second chip, the first distance is shorter than the second distance.

18. The exposure head according to claim 17, wherein the first chip and the second chip are arranged to overlap partially with each other when viewed in the transverse direction.

19. The exposure head according to claim 15, wherein, in the transverse direction, a third distance between the first edge and the second electrode array is shorter than a fourth distance between the second edge and the second electrode array.

* * * * *